US008544576B2

(12) United States Patent
Shono et al.

(10) Patent No.: US 8,544,576 B2
(45) Date of Patent: Oct. 1, 2013

(54) HYBRID CONSTRUCTION MACHINE AND METHOD OF CONTROLLING HYBRID CONSTRUCTION MACHINE

(75) Inventors: Hiroso Shono, Yokosuka (JP); Hideaki Kanbayashi, Yokosuka (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 523 days.

(21) Appl. No.: 12/810,156

(22) PCT Filed: Dec. 26, 2008

(86) PCT No.: PCT/JP2008/073833
§ 371 (c)(1),
(2), (4) Date: Jun. 23, 2010

(87) PCT Pub. No.: WO2009/082010
PCT Pub. Date: Jul. 2, 2009

(65) Prior Publication Data
US 2010/0270095 A1    Oct. 28, 2010

(30) Foreign Application Priority Data

Dec. 26, 2007   (JP) .................................. 2007-334350

(51) Int. Cl.
*B60K 6/20* (2007.10)
*B60W 10/00* (2006.01)

(52) U.S. Cl.
USPC .................................. 180/65.265; 180/65.1

(58) Field of Classification Search
USPC ................... 318/376, 318; 180/65.1, 65.275, 180/65.285, 65.29, 65.31; 307/10.1; 320/104, 320/132
See application file for complete search history.

(56) References Cited

U.S. PATENT DOCUMENTS 6,864,663 B2 * 3/2005 Komiyama et al. ........... 320/104
7,215,034 B2 * 5/2007 Hino et al. .................. 290/40 C

FOREIGN PATENT DOCUMENTS

| JP | 10-103112 | 4/1998 |
| JP | 2002-242234 | 8/2002 |
| JP | 2002-330554 | 11/2002 |
| JP | 2003-125576 | 4/2003 |

* cited by examiner

*Primary Examiner* — John Walters
*Assistant Examiner* — James Triggs
(74) *Attorney, Agent, or Firm* — IPUSA, PLLC

(57) ABSTRACT

A hybrid construction machine including an internal combustion engine, a motor generator, a hydraulically driven working element, and a rotation mechanism rotationally driven by a rotation electric motor includes a charge storage part provided between the motor generator and the rotation electric motor, wherein the charge storage part includes a constant voltage charge storage part configured to maintain its voltage value within a certain range; and a variable voltage charge storage part configured to tolerate a variation in the voltage value of the charge storage part due to the electric motor and the generator operation of the motor generator or the power running and the regenerative operation of the rotation electric motor.

14 Claims, 16 Drawing Sheets

HYBRID CONSTRUCTION MACHINE AND METHOD OF CONTROLLING HYBRID CONSTRUCTION MACHINE

TECHNICAL FIELD

The present invention relates to a hybrid construction machine using a step-up and step-down converter that has a step-up switching device and a step-down switching device and controls power supply to a load and supply of regenerated energy obtained from the load to a charge storage, and to a method of controlling the hybrid construction machine.

BACKGROUND ART

Conventionally, hybrid construction machines have been proposed whose drive mechanisms are partially motorized. Such construction machines have a hydraulic pump for hydraulically driving working elements such as a boom, an arm, and a bucket, and have a motor generator connected via a speed-increasing machine to an engine for driving this hydraulic pump, so as to assist the driving of the engine with the motor generator and to charge a battery with the power produced by power generation.

Further, such construction machines have an electric motor in addition to a hydraulic motor as a power source for a rotation mechanism for rotating an upper rotating body. Such construction machines assist the driving of the hydraulic motor with the electric motor at the time of accelerating the rotation mechanism, and perform a regenerative operation with the electric motor to charge the battery with generated power at the time of decelerating the rotation mechanism. (See, for example, Patent Document 1.)

[Patent Document 1] Japanese Laid-Open Patent Application No. 10-103112

DISCLOSURE OF THE INVENTION

Problems to be Solved by the Invention

According to such hybrid construction machines, power consumption and energy regeneration by a load such as a motor generator are repeatedly performed, so that the voltage value of a charge storage part varies greatly.

There has been a problem in that the variation of the voltage value of the charge storage part may cause a variation in the controllability of the load or cause damage to the driver of the load due to overcurrent.

Accordingly, the present invention has an object of providing a hybrid construction machine and a method of controlling the hybrid construction machine that control a variation in the voltage value of the charge storage part and prevent occurrence of a variation in the controllability of a load and occurrence of damage to the driver of the load due to overcurrent.

Means for Solving the Problems

A hybrid construction machine according to one aspect of the present invention, which includes an internal combustion engine, a motor generator, a hydraulically driven working element, and a rotation mechanism rotationally driven by a rotation electric motor, includes a charge storage part provided between the motor generator and the rotation electric motor, wherein the charge storage part includes a constant voltage charge storage part configured to maintain a voltage value thereof within a certain range; and a variable voltage charge storage part configured to tolerate a variation in a voltage value of the charge storage part due to an electric motor and a generator operation of the motor generator or a power running and a regenerative operation of the rotation electric motor.

The hybrid construction machine may further include a step-up and step-down converter having a first side thereof connected to the constant voltage charge storage part and having a second side thereof connected to the variable voltage charge storage part, the step-up and step-down converter being configured to raise or lower the voltage value of the constant voltage charge storage part by varying a voltage value of the variable voltage charge storage part; and a step-up and step-down drive control part configured to control switching of a voltage raising operation and a voltage lowering operation of the step-up and step-down converter.

The hybrid construction machine may further include a voltage value detecting part configured to detect the voltage value of the constant voltage charge storage part, wherein the step-up and step-down drive control part may control the switching of the voltage raising operation and the voltage lowering operation based on the voltage value detected by the voltage value detecting part.

The step-up and step-down drive control part may control the switching of the voltage raising operation and the voltage lowering operation in accordance with an operating state of the rotation electric motor so that the voltage value of the constant voltage charge storage part falls within the certain range.

The step-up and step-down drive control part may provide a time of no operation in switching one to another of the voltage raising operation and the voltage lowering operation of the step-up and step-down converter.

The step-up and step-down converter may include a step-up switching device for controlling a supply of electric power from the variable voltage charge storage part to the constant voltage charge storage part; a step-down switching device for controlling a supply of electric power from the constant voltage charge storage part to the variable voltage charge storage part; and a reactor connected to the step-up switching device and the step-down switching device, and the step-up and step-down drive control part may include a voltage control part configured to control driving of the step-up switching device or the step-down switching device so that the voltage value of the voltage value detecting part becomes a voltage target value; a current control part configured to control driving of the step-up switching device or the step-down switching device so that a value of a current flowing through the reactor becomes a predetermined current threshold; and a control switching part configured to perform switching selectively to one of the voltage control part and the current control part so that a load on the step-up and step-down converter becomes less than or equal to a predetermined load.

The control switching part may perform switching to a drive control by the current control part in response to an absolute value of the current flowing through the reactor becoming greater than the current threshold during performance of a drive control by the voltage control part.

The control switching part may perform switching to a drive control by the voltage control part in response to the voltage value of the voltage value detecting part returning to the voltage target value during performance of a drive control by the current control part.

In switching one to another of the voltage control part and the current control part, the step-up and step-down drive control part may correct an initial value of a control target value after the switching.

The step-up and step-down drive control part may perform such control as to increase a charging or discharge current in a dead zone region of the step-up and step-down converter.

The step-up and step-down drive control part may include a main control part configured to calculate a PWM duty value for driving the step-up and step-down converter so that the voltage value of the constant voltage charge storage part follows a target voltage value; a compensation duty value calculating part configured to calculate a compensation duty value for compensating for the PWM duty value in a predetermined low current region in a current value characteristic of the step-up and step-down converter relative to the PWM duty value; and a combining part configured to perform a combining operation of combining the compensation duty value with the PWM duty value calculated by the main control part.

The main control part may be configured to calculate the PWM duty value by PI control based on a deviation between the voltage value of the constant voltage charge storage part and the target voltage value, and a replacing part may be farther included that replaces an integral component value included in the PWM duty value with an opposite of a proportional component value at a time of starting an activation of the combining operation.

The compensation duty value calculating part may calculate, as the compensation duty value, a duty value corresponding to the PWM duty value at an inflection point on a step-up side or a step-down side in the current value characteristic of the step-up and step-down converter relative to the PWM duty value.

In a method of controlling a hybrid construction machine including an internal combustion engine, a motor generator, a hydraulically driven working element, a rotation mechanism rotationally driven by a rotation electric motor, and a charge storage part provided between the motor generator and the rotation electric motor and including a constant voltage charge storage part and a variable voltage charge storage part according to one aspect of the present invention, the constant voltage charge storage part maintains a voltage value thereof within a certain range; and the variable voltage charge storage part tolerates a variation in a voltage value of the charge storage part due to an electric motor and a generator operation of the motor generator or a power running and a regenerative operation of the rotation electric motor.

Effects of the Invention

According to the present invention, a characteristic effect is produced that it is possible to provide a hybrid construction machine and a method of controlling the hybrid construction machine that control a variation in the voltage value of the charge storage part and prevent occurrence of a variation in the controllability of a load and occurrence of damage to the driver of the load due to overcurrent.

DESCRIPTION OF THE REFERENCE NUMERALS

Figure 1:
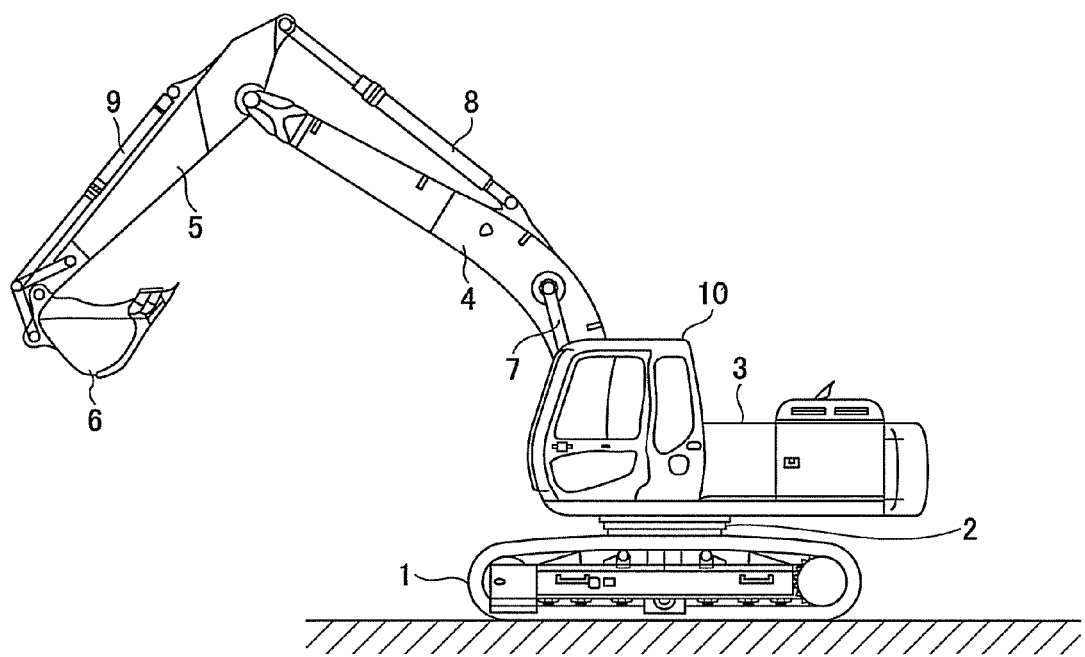
FIG. 1 is a side view illustrating a hybrid construction machine of a first embodiment.

| | |
|---|---|
| 1 | lower-part traveling body |
| 1A, 1B | hydraulic motor |
| 2 | rotation mechanism |
| 3 | upper-part rotating body |
| 4 | boom |
| 5 | arm |
| 6 | bucket |
| 7 | boom cylinder |
| 8 | arm cylinder |
| 9 | bucket cylinder |
| 10 | cabin |
| 11 | engine |
| 12 | motor generator |

-continued

| DESCRIPTION OF THE REFERENCE NUMERALS | |
|---|---|
| 13 | reduction machine |
| 14 | main pump |
| 15 | pilot pump |
| 16 | high-pressure hydraulic line |
| 17 | control valve |
| 18, 20 | inverter |
| 19 | battery |
| 21 | rotation electric motor |
| 22 | resolver |
| 23 | mechanical brake |
| 24 | rotation reduction machine |
| 25 | pilot line |
| 26 | operation apparatus |
| 26A, 26B | lever |
| 26C | pedal |
| 27 | hydraulic line |
| 28 | hydraulic line |
| 29 | pressure sensor |
| 30 | controller |
| 100 | step-up and step-down converter |
| 101 | reactor |
| 102A | step-up IGBT |
| 102B | step-down IGBT |
| 104 | power supply connection terminals |
| 105 | inverter |
| 106 | output terminals |
| 107 | capacitor |
| 110 | DC bus |
| 111 | DC bus voltage detecting part |
| 112 | battery voltage detecting part |
| 113 | battery current detecting part |
| 120 | drive control part |
| 121 | voltage control part |
| 122 | current control part |
| 123 | control switching part |
| 124 | step-up and step-down switching part |
| 125 | step-up PM |
| 126 | step-down PM |
| 201 | voltage control instruction generating part |
| 202 | voltage control part |
| 203 | PWM instruction calculating part |
| 204 | PWM instruction combining part |
| 205 | step-up and step-down switching control part |
| 206 | compensation value calculating part |
| 207 | compensation value switching part |

BEST MODE FOR CARRYING OUT THE INVENTION

A description is given below of embodiments to which a hybrid construction machine, a hybrid construction machine and a method of controlling the hybrid construction machine according to the present invention are applied.

[First Embodiment]

FIG. 1 is a side view illustrating a construction machine including a hybrid construction machine according to a first embodiment.

An upper-part rotating body 3 is mounted through a rotation mechanism 2 on a lower-part traveling body 1 of this hybrid construction machine. Further, in addition to a boom 4, an arm 5, a bucket 6, and a boom cylinder 7, an arm cylinder 8, and a bucket cylinder 9 for hydraulically driving them, a cabin 10 and power sources are mounted on the upper-part rotating body 3.

[Overall Configuration]

Figure 2:
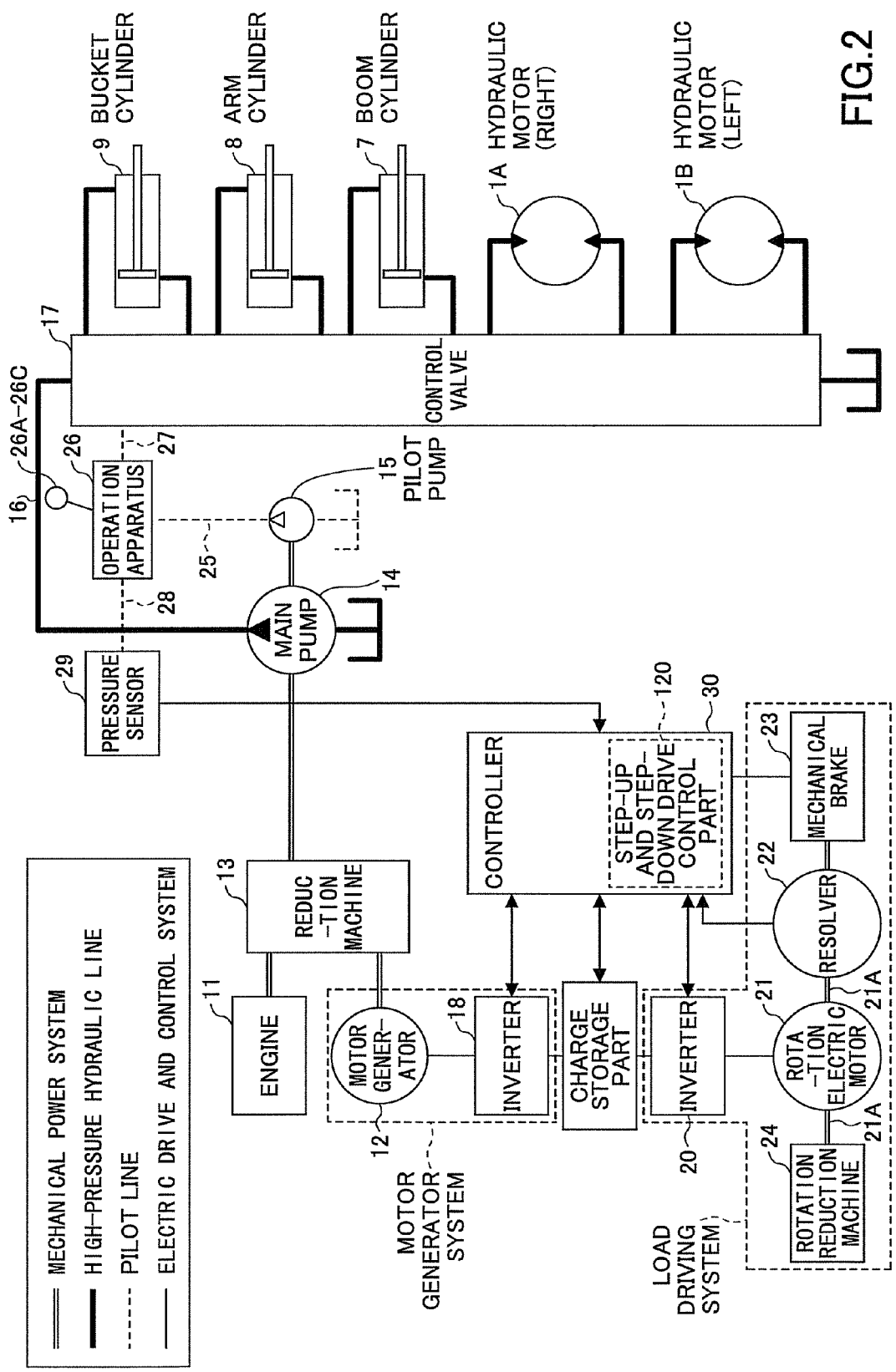
FIG. 2 is a block diagram illustrating a configuration of the hybrid construction machine of the first embodiment.

FIG. 2 is a block diagram illustrating a configuration of the hybrid construction machine of the first embodiment. In FIG. 2, a double line, a bold solid line, a broken line, and a solid line indicate a mechanical power system, a high-pressure hydraulic line, a pilot line, and an electric drive and control system, respectively.

An engine 11 as a mechanical drive part and a motor generator 12 as an assist drive part are both connected to the input shafts of a reduction machine 13. Further, a main pump 14 and a pilot pump 15 are connected to the output shaft of this reduction machine 13. A control valve 17 is connected to the main pump 14 via a high-pressure hydraulic line 16.

The control valve 17 is a controller that controls a hydraulic system in the construction machine of the first embodiment. Hydraulic motors 1A (for the right) and 1B (for the left) for the lower-part traveling body 1, the boom cylinder 7, the arm cylinder 8, and the bucket cylinder 9 are connected to this control valve 17 via high-pressure hydraulic lines.

Further, a charge storage part 50 is connected to the motor generator 12 via an inverter 18. This charge storage part 50 provides and receives electric power to and from the motor generator 12 via the inverter 18.

Further, a rotation electric motor 21 as an electric working element is connected to the charge storage part 50 via an inverter 20. The charge storage part 50 provides and receives electric power to and from the rotation electric motor 21 via the inverter 20.

That is, the charge storage part 50 is provided in order to provide and receive electric power to and from the motor generator 12 and the rotation electric motor 21.

A revolver 22, a mechanical brake 23, and a rotation reduction machine 24 are connected to a rotation shaft 21A of the rotation electric motor 21. Further, an operation apparatus 26 is connected to the pilot pump 15 via a pilot line 25. The rotation electric motor 21, the inverter 20, the resolver 22, and the rotation reduction machine 24 constitute a load driving system.

The operation apparatus 26 includes a lever 26A, a lever 26B, and a pedal 26C. The control valve 17 and a pressure sensor 29 are connected to the lever 26A, the lever 26B, and the pedal 26C via hydraulic lines 27 and 28, respectively. A controller 30 that controls the driving of the electric system of the construction machine of the first embodiment is connected to this pressure sensor 29.

This construction machine of the first embodiment is a hybrid construction machine that uses the engine 11, the motor generator 12, and the rotation electric motor 21 as power sources. These power sources are mounted on the upper-part rotating body 3 illustrated in FIG. 1. A description is given below of each part.

[Configuration of Each Part]

The engine 11, which is, for example, an internal combustion engine constituted of a diesel engine, has its output shaft connected to one of the input shafts of the reduction machine 13. The engine 11 is operated constantly during the operation of the construction machine.

The motor generator 12 may be an electric motor capable of performing both an electric motor (assist) operation and a generator operation. Here, a motor generator AC-driven by the inverter 20 is illustrated as the motor generator 12. This motor generator 12 may be constituted of, for example, an IPM (Interior Permanent Magnetic) motor having magnets embedded in a rotor. The rotation shaft of the motor generator 12 is connected to the other one of the input shafts of the reduction machine 13.

The reduction machine 13 has two input shafts and one output shaft. The two input shafts are connected to the drive shaft of the engine 11 and the drive shaft of the motor generator 12, respectively. Further, the output shaft is connected to the drive shaft of the main pump 14. In the case of a heavy load on the engine 11, the motor generator 12 performs an electric motor (assist) operation, so that the driving force of the motor generator 12 is transmitted to the main pump 14 via the output shaft of the reduction machine 13. This assists the driving of the engine 11. On the other hand, in the case of a light load on the engine 11, the driving force of the engine 11 is transmitted to the motor generator 12 via the reduction machine 13, so that the motor generator 12 performs a generator operation to generate power. The power running operation and the generator operation of the motor generator 12 are switched by the controller 30 in accordance with a load on the engine 11.

The main pump 14 is a pump that generates a hydraulic pressure to be supplied to the control valve 17. This hydraulic pressure is supplied via the control valve 17 to drive each of the hydraulic motors 1A and 1B, the boom cylinder 7, the arm cylinder 8, and the bucket cylinder 9.

The pilot pump 15 is a pump that generates a pilot pressure necessary for a hydraulic operation system. A description is given below of a configuration of this hydraulic operation system.

The control valve 17 is a hydraulic pressure controller that hydraulically controls the driving of the hydraulic motors 1A and 1B for the lower-part traveling body 1, the boom cylinder 7, the arm cylinder 8, and the bucket cylinder 9, which are connected via high-pressure hydraulic lines to the control valve 17, by controlling a hydraulic pressure to be supplied to each of them in accordance with an input of an operation by an operator.

The inverter 18, which is provided between the motor generator 12 and the charge storage part 50 as described above, controls the operation of the motor generator 12 based on instructions from the controller 30. Thus, when controlling the power running operation of the motor generator 12, the inverter 18 supplies necessary electric power to the motor generator 12 from the charge storage part 50. On the other hand, when controlling the regenerative operation of the motor generator 12, the inverter 18 charges the charge storage part 50 with the electric power generated by the motor generator 12. The motor generator 12 and the inverter 18 constitute a motor generator system.

The rotation electric motor 21, which may be an electric motor capable of both a power running operation and a regenerative operation, is provided in order to drive the rotation mechanism 2 of the upper-part rotating body 3. At the time of a power running operation, the rotating force of the rotational drive power of the rotation electric motor 21 is amplified by the reduction machine 24, and the upper-part rotating body 3 is subjected to an acceleration or deceleration control to make a rotational movement. Further, the number of revolutions is increased in the reduction machine 24 by the inertial rotation of the upper-part rotating body 3 to be transmitted to the rotation electric motor 21, thereby making it possible to regenerate electric power. Here, an electric motor AC-driven by the inverter 20 based on a PWM (Pulse Width Modulation) control signal is illustrated as the rotation electric motor 21. This rotation electric motor 21 may be constituted of an IPM motor of a magnet embedded type. This makes it possible to generate a larger induced electromotive force, so that it is possible to increase electric power generated by the rotation electric motor 21 at the time of regeneration.

The resolver 22 is a sensor that detects the rotation position and the rotation angle of the rotation shaft 21A of the rotation electric motor 21. The resolver 22 is mechanically joined to the rotation electric motor 21 to detect a difference between the rotation position before rotation and the rotation position after a counterclockwise rotation or a clockwise rotation of the rotation shaft 21A of the rotation electric motor 21, thereby detecting the rotation angle and the rotation direction of the rotation shaft 21A. By detecting the rotation angle of the rotation shaft 21A of the rotation electric motor 21, the rotation angle and the rotation direction of the rotation mechanism 2 are derived. Further, FIG. 2 illustrates a configuration where the resolver 22 is attached, while an inverter control system without the rotation sensor of an electric motor may also be employed.

The mechanical brake 23, which is a braking device that generates a mechanical braking force, mechanically stops the rotation shaft 21A of the rotation electric motor 21. This mechanical brake 23 is switched between braking and release by an electromagnetic switch. This switching is performed by the controller 30.

The rotation reduction machine 24 is a reduction machine that reduces the rotation speed of the rotation shaft 21A of the rotation electric motor 21 and mechanically transmits it to the rotation mechanism 2. This makes it possible to increase the rotating force of the rotation electric motor 21 and transmit it as a larger rotating force to the rotating body at the time of a power running operation. On the other hand, at the time of a regenerative operation, it is possible to generate more rotations in the rotation electric motor 21 by increasing the number of revolutions generated in the rotating body.

The rotation mechanism 2 is rotatable with the mechanical brake 23 of the rotation electric motor 21 being released, so that the upper-part rotating body 3 is rotated counterclockwise or clockwise.

The operation apparatus 26, which is an operation apparatus for operating the operation electric motor 21, the lower-part traveling body 1, the boom 4, the arm 5, and the bucket 6, is operated by an operator of the hybrid construction machine.

This operation apparatus 26 converts a hydraulic pressure (a primary-side hydraulic pressure) supplied through the pilot line 25 into a hydraulic pressure (a secondary-side hydraulic pressure) corresponding to the amount of operation by the operator, and outputs it. The secondary-side hydraulic pressure output from the operation apparatus 26 is supplied to the control valve 17 through the hydraulic line 27, and is also detected by the pressure sensor 29.

When the operation apparatus 26 is operated, the control valve 17 is driven via the hydraulic line 27, so that the hydraulic pressures inside the hydraulic motors 1A and 1B, the boom cylinder 7, the arm cylinder 8, and the bucket cylinder 9 are controlled. Thereby, the lower-part traveling body 1, the boom 4, the arm 5, and the bucket 6 are driven.

The hydraulic line 27 supplies hydraulic pressures necessary for driving the hydraulic motors 1A and 1B, the boom cylinder 7, the arm cylinder 8, and the bucket cylinder 9 to the control valve 17.

In the pressure sensor 29 as a rotation operation detecting part, when an operation for rotating the rotation mechanism 2 is input to the operation apparatus 26, the amount of this operation is detected as a change in the hydraulic pressure inside the hydraulic line 28. The pressure sensor 29 outputs an electrical signal representing the hydraulic pressure inside the hydraulic line 28. This makes it possible to accurately read the amount of the operation for rotating the rotation mechanism 2 input to the operation apparatus 26. This electrical signal is input to the controller 30 to be used to control the driving of the rotation electric motor 21. Further, in the first embodiment, a description is given of a configuration where a pressure sensor as a level operation detecting part is used. Alternatively, a sensor may be used that reads the amount of operation for rotating the rotation mechanism 2 input to the operation apparatus 26 directly as an electrical signal.

The charge storage part 50 is connected to the inverter 18 and the inverter 20. Thereby, the charge storage part 50 serves as a power supply for supplying necessary power for the electric motor (assist) operation of the motor generator 12 or the power running operation of the rotation electric motor 21 when at least one of the electric motor (assist) operation and the power running operation is performed, and for storing the electric power generated by the generator operation of the motor generator 12 or the regenerative operation of the rotation electric motor 21 as electric energy when at least one of the generator operation and the regenerative operation is performed.

The charging and discharging of this charge storage part 50 are controlled by the controller 30 based on the charge state of the charge storage part 50, the operating state (electric motor [assist] operation or generator operation) of the motor generator 12, and the operating state (power running operation or regenerative operation) of the rotation electric motor 21.

The inverter 20, which is provided between the rotation electric motor 21 and the charge storage part 50 as described above, controls the operation of the rotation electric motor 21 based on instructions from the controller 30. As a result, when controlling the power running operation of the rotation electric motor 21, the inverter 20 supplies necessary electric power to the rotation electric motor 21 from the charge storage part 50. Further, during the regenerative operation of the rotation electric motor 21, the inverter 20 charges the charge storage part 50 with the electric power generated by the rotation electric motor 21. FIG. 2 illustrates an embodiment including a rotation electric motor (one) and an inverter (one). Alternatively, multiple electric motors and multiple inverters may also be connected to the charge storage part 50 by providing them as drive parts for other than the magnet mechanism and the rotation mechanism part.

By the way, in such a hybrid construction machine, since power consumption and power regeneration are repeatedly performed by a load such as the motor generator 12, the voltage value of the charge storage part varies greatly. The variation of the voltage value of the charge storage part causes a variation in the controllability of the load. This causes a variation in the output of the rotation electric motor 21, thus reducing its workability. Further, the driver of the load may be damaged by overcurrent to affect operational continuity.

Figure 3:
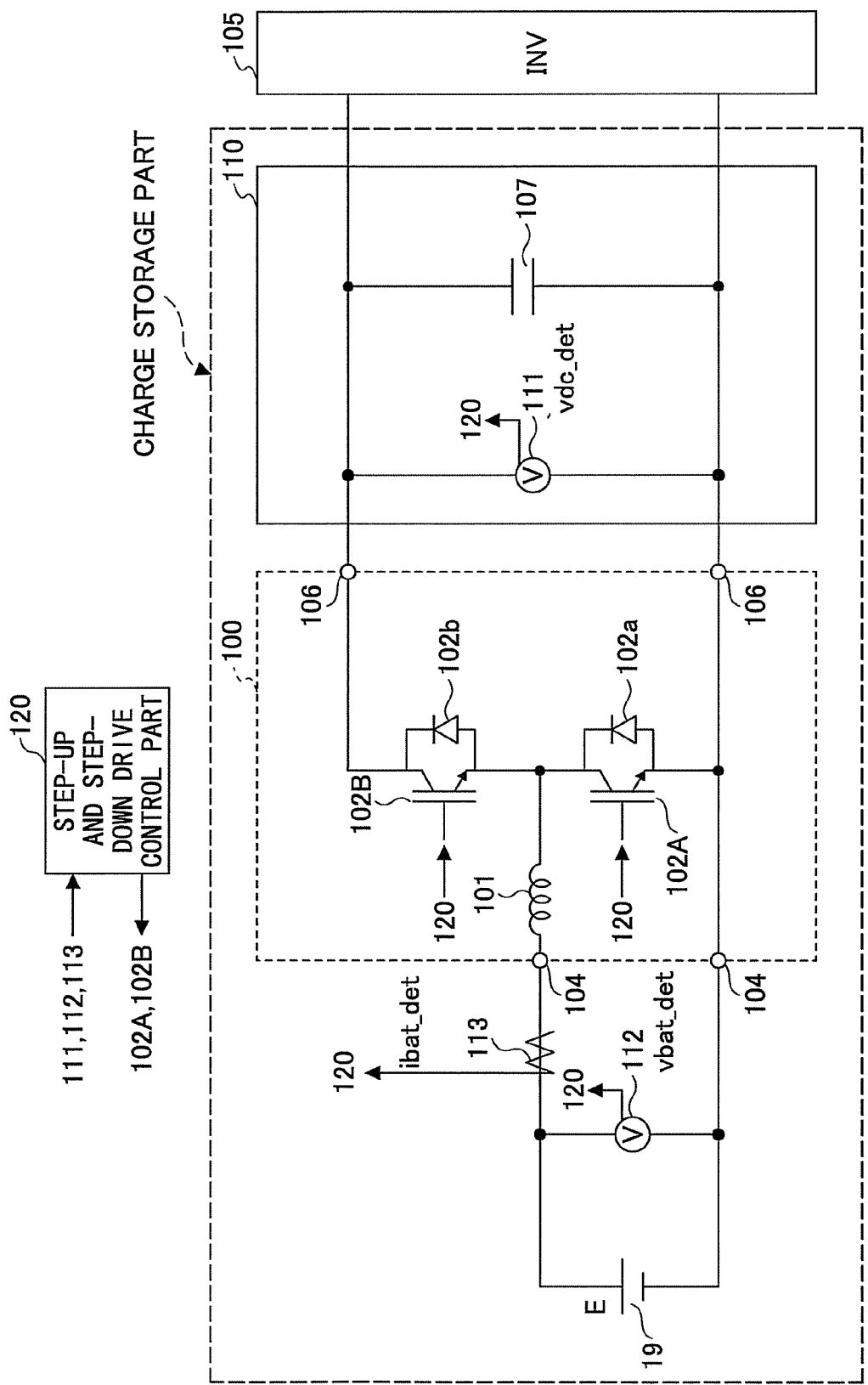
FIG. 3 is a diagram schematically illustrating a circuit configuration of a step-up and step-down converter used for the hybrid construction machine of the first embodiment.

Therefore, according to this embodiment, the charge storage part 50 is constituted of a DC bus 110 as a constant voltage charge storage part and a battery 19 as a variable voltage charge storage part as illustrated in FIG. 3, and the inverters 18 and 20 are connected to the DC bus 110. This makes it possible to keep a voltage to be supplied to the inverters 18 and 20 so that the voltage falls within a predetermined certain range. As a result, it is possible to control a variation in the controllability of the load, so that it is possible to control variations in the outputs of the motor generator 12 and the rotation electric motor 21. Further, by varying the charge storage voltage of the battery 19, it is possible to tolerate a variation in the voltage value due to the electric motor and the generator operation of the motor generator 12 or the power running and the regenerative operation of the rotation electric motor 21. Thereby, it is possible to prevent damage in the inverters 18 and 20 of the loads due to overcurrent, so that it is possible to improve operational continuity.

[Controller 30]

The controller 30, which is a controller that controls the driving of the hybrid construction machine of the first embodiment, includes a step-up and step-down drive control part 120 as a step-up and step-down control part that performs step-up and step-down voltage control, and is constituted of a processor including a CPU (Central Processing Unit) and an internal memory. The controller 30 is a device implemented by the CPU executing a program for drive control contained in the internal memory.

The step-up and step-down drive control part 120 is a controller for controlling the operation of the motor generator 12 (switching to an electric motor [assist] operation or a generator operation) and controlling the charging and discharging of the charge storage part 50. The step-up and step-down drive control part 120 controls the charging and discharging of the charge storage part 50 based on the charge state of the charge storage part 50, the operating state (electric motor [assist] operation or generator operation) of the motor generator 12, and the operating state (power running operation or regenerative operation) of the rotation electric motor 21.

FIG. 3 is a detailed diagram of the charge storage part 50 used for the hybrid construction machine of the first embodiment.

This charge storage part 50 includes the battery 19, a step-up and step-down converter 100, and the DC bus 110. An inverter 105 is connected to the DC bus 110. The battery 19 as a variable voltage charge storage part and the DC bus 110 as a constant voltage charge storage part constitute the charge storage part 50.

The step-up and step-down converter 100 has a reactor 101, a step-up IGBT (Insulated Gate Bipolar Transistor) 102A, a step-down IGBT 102B, power supply connection terminals 104 for connecting the battery 19, and output terminals 106 for connecting the inverter 105. The output terminals 106 and the inverter 105 are connected via the DC bus 110. The inverter 105 corresponds to the inverters 18 and 20.

The reactor 101, which has its one end connected to the intermediate point of the step-up IGBT 102A and the step-down IGBT 102B and has its other end connected to the power supply connection terminal 104, is provided for supplying the DC bus 110 with the induced electromotive power generated with the turning ON and OFF of the step-up IGBT 102A.

The step-up IGBT 102A and the step-down IGBT 102B, which are constituted of bipolar transistors each having a MOSFET (Metal Oxide Semiconductor Field Effect Transistor) incorporated into its gate part, are semiconductor devices capable of high-speed switching with high power. The step-up IGBT 102A and the step-down IGBT 102B are driven by application of PWM voltage to their gate terminals by the step-up and step-down drive control part 120. Diodes 102a and 102b, which are rectifying elements, are connected in parallel to the step-up IGBT 102A and the step-down IGBT 102B, respectively.

The battery 19 may be a chargeable and dischargeable charge storage so as to be able to provide and receive electric power to and from the DC bus 110 via the step-up and step-down converter 100.

The power supply connection terminals 104 and the output terminals 106 may be terminals connectable to the battery 19 and the inverter 105, respectively. A battery voltage detecting part 112 that detects battery voltage is connected in parallel to the paired power supply connection terminals 104. A DC bus voltage detecting part 111 that detects DC bus voltage is connected in parallel to the paired output terminals 106.

The battery voltage detecting part 112 detects the voltage value of the battery 19 (vbat_det), and the DC bus voltage detecting part 111 detects the voltage of the DC bus 110 (hereinafter, DC bus voltage: vdc_det).

A battery current detecting part 113, which may be a detection part capable of detecting the value of current flowing through the battery 19, includes a resistor for current detection. This battery current detecting part 113 detects the value of current flowing through the battery 19 ($ibat_{13}$ det).

[Step-Up and Step-Down Operations]

In this step-up and step-down converter 100, in the case of raising the voltage of the DC bus 110, a PWM voltage is applied to the gate terminal of the step-up IGBT 102A so as to supply the induced electromotive force generated in the reactor 101 with the turning ON and OFF of the step-up IGBT 102A to the DC bus 110 via the diode 102b connected in parallel to the step-down IGBT 102B. As a result, the voltage of the DC bus 110 is raised.

Further, in the case of lowering the voltage of the DC bus 110, a PWM voltage is applied to the gate terminal of the step-down IGBT 102B so as to supply regenerated electric power, fed through the step-down IGBT 102B and the inverter 105, to the battery 19 from the DC bus 110. As a result, the battery 19 is charged with the electric power stored in the DC bus 110, so that the voltage of the DC bus 110 is lowered.

Actually, between the step-up and step-down drive control part 120 and the step-up IGBT 102A and the step-down IGBT 102B, there is a drive part that generates PWM signals to drive the step-up IGBT 102A and the step-down IGBT 102B, which is omitted in FIG. 3. Such a drive part can be implemented by either an electronic circuit or a processor.

Next, a description is given of the configuration illustrated in FIG. 3 in terms of a relationship with FIG. 2.

The battery 19 is connected to the inverter 105 (the inverter 18 and the inverter 20) via the step-up and step-down converter 100 and the DC bus 110. Thereby, the battery 19 serves as a power supply for supplying necessary power for the electric motor (assist) operation of the motor generator 12 or the power running operation of the rotation electric motor 21 when at least one of the electric motor (assist) operation and the power running operation is performed, and for storing the electric power generated by the generator operation of the motor generator 12 or the regenerative operation of the rotation electric motor 21 as electric energy when at least one of the generator operation and the regenerative operation is performed.

The DC bus 110 is provided between the inverter 105 (the inverter 18 and the inverter 20) and the step-up and step-down converter 100 so as to allow electric power to be transferred between the battery 19 and the motor generator 12 and the rotation electric motor 21. The DC bus 110 has a capacitor 107 for smoothing inserted in parallel into the paired output terminals 106 of the step-up and step-down converter 100. This capacitor 107 for smoothing may be a charge storage element inserted between the positive and the negative output terminal 106 to be able to smooth the DC bus voltage.

The DC bus voltage detecting part 111 is a voltage detecting part for detecting a DC bus voltage value. The detected DC bus voltage value is input to the controller 30 to be used to control switching between a step-up operation and a step-down operation for causing this DC bus voltage value to fall within a certain range. The DC bus voltage value detected in this DC bus voltage detecting part 111 is input to the step-up and step-down drive control part 120.

The battery voltage detecting part 112, which is a voltage detecting part for detecting the voltage value of the battery 19, is used to detect the charge state of the battery 19. The detected battery voltage value is input to the controller 30 to be used to control switching between the step-up operation and the step-down operation of the step-up and step-down converter 100. The battery voltage value detected in this battery voltage detecting part 112 is input to the step-up and step-down drive control part 120.

The battery current detecting part 113 is a current detecting part for detecting the current value of the battery 19. The battery current value is detected with reference to a current flowing from the battery 19 to the step-up and step-down converter 100 as a positive value. The detected battery current value is input to the controller 30 to be used to control switching between the step-up operation and the step-down operation of the step-up and step-down converter 100. The battery current value detected in this battery current detecting part 113 is input to the step-up and step-down drive control part 120.

This control of the charging and discharging of the battery 19 is performed by the step-up and step-down converter 100 based on the charge state of the battery 19, the operating state (electric motor [assist] operation or generator operation) of the motor generator 12, and the operating state (power running operation or regenerative operation) of the rotation electric motor 21. The switching between the step-up operation and the step-down operation of the step-up and step-down converter 100 is controlled by the step-up and step-down drive control part 120 based on the DC bus voltage value detected by the DC bus voltage detecting part 111, the battery voltage value detected by the battery voltage detecting part 112, and the battery current value detected by the battery current detecting part 113.

The step-up and step-down converter 100, which has its one side connected to the inverter 105 (the inverter 18 and the inverter 20) via the DC bus 110 and has its other side connected to the battery 19, switches between raising voltage and lowering voltage so that the DC bus voltage value falls within a certain range. Specifically, the step-up and step-down drive control part 120 calculates a control instruction value by comparing the DC bus voltage value detected by the DC bus voltage detecting part 111 and the target voltage value of the DC bus 110, and controls the switching of the step-up IGBT 102A and the step-down IGBT 102B. When the motor generator 12 performs an electric motor (assist) operation, it is necessary to supply electric power to the motor generator 12 through the inverter 18, so that it is necessary to raise the DC bus voltage value. On the other hand, when the motor generator 12 performs a generator operation, it is necessary to charge the battery 19 with generated electric power through the inverter 18. The same is the case with the power running operation and the regenerative operation of the rotation electric motor 21. In addition, since the operating state of the motor generator 12 is switched in accordance with the load state of the engine 11 and the operating state of the rotation electric motor 21 is switched in accordance with the rotating operation of the upper-part rotating body 3, a situation may result where one of the motor generator 12 and the rotation electric motor 21 performs an electric motor (assist) operation or a power running operation and the other performs a generator operation or a regenerative operation.

Therefore, the step-up and step-down converter 100 performs the control of switching a step-up operation and a step-down operation so that the DC bus voltage value falls within a certain range in accordance with the operating states of the motor generator 12 and the rotation electric motor 21.

Thus, by placing the step-up and step-down converter 110 between the DC bus 110 as a constant voltage charge storage part and the battery 19 as a variable voltage charge storage part, it is possible to keep the voltage value of the DC bus 110 so that the voltage value of the DC bus 110 falls within a predetermined certain range. Accordingly, by stabilizing the voltage supplied to the inverters 18 and 20, it is possible to stabilize the outputs of the motor generator 12 and the rotation electric motor 21.

In FIG. 3, the battery 19 is illustrated as a charge storage. Alternatively, a capacitor, a chargeable and dischargeable secondary battery, or another form of power supply capable of providing and receiving electric power may also be used as a charge storage in place of the battery 19.

However, common step-up and step-down converters have a problem in performing voltage control. For example, in step-up and step-down converters, it is dangerous to turn ON a step-up switching device and a step-down switching device simultaneously because it causes a large current to flow for structural reasons. Further, when a load such as a motor generator needs a large amount of electric power or a large amount of current is supplied for charging by the regenerative operation of the load during performance of a step-up operation or a step-down operation by voltage control, the step-up and step-down converter 100 may become overloaded, so that overcurrent may flow through and damage the switching devices.

Therefore, in a second embodiment, the step-up and step-down drive control part 120 is provided with a voltage control part 121 and a current control part 122, thereby performing switching control so that a load on the step-up and step-down converter 100 is less than or equal to a predetermined load by switching voltage control and current control.

[Second Embodiment]

Figure 4:
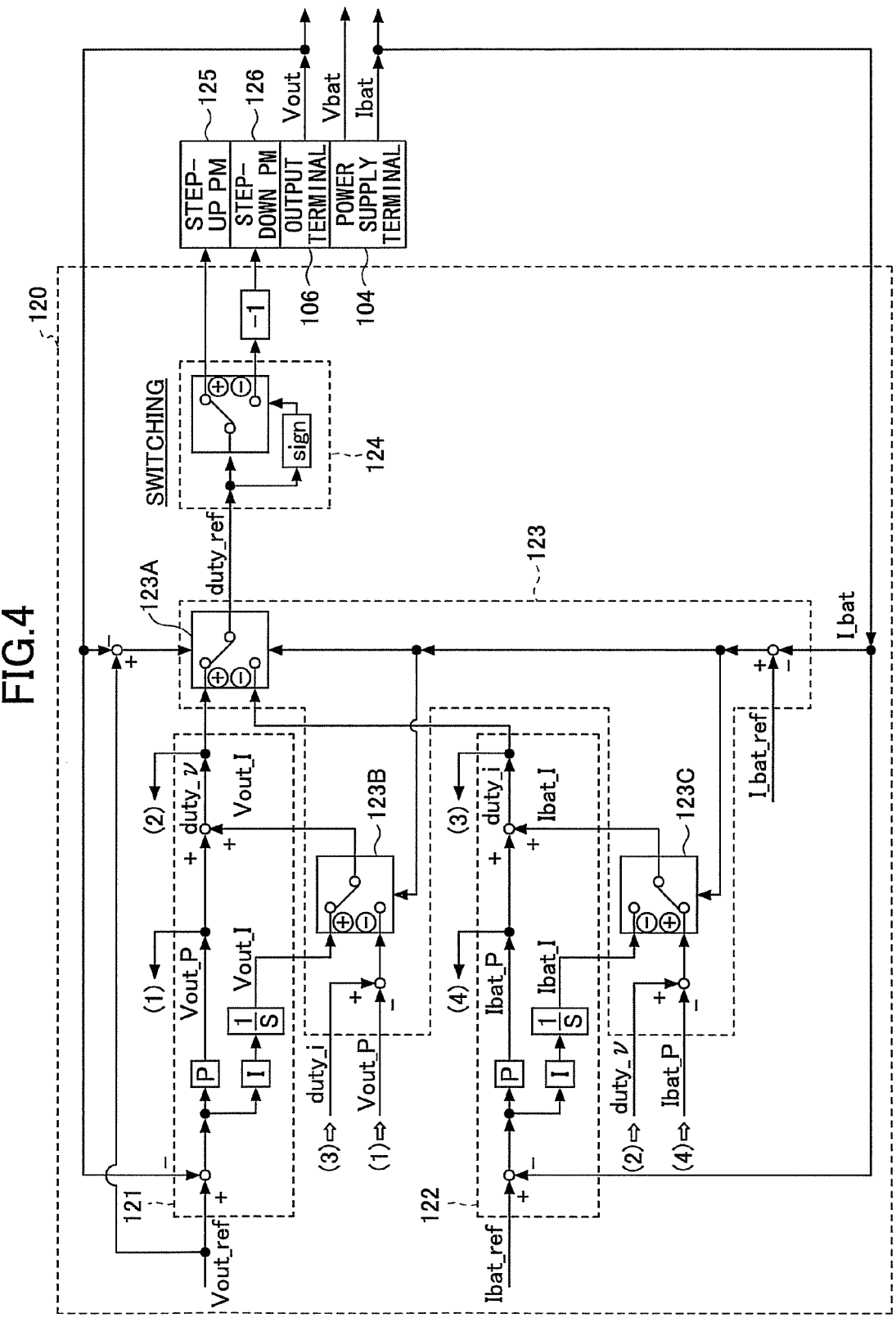
FIG. 4 is a diagram illustrating, with control blocks, a circuit configuration of a controller of the step-up and step-down converter used for a hybrid construction machine of a second embodiment.

FIG. 4 is a diagram illustrating, with control blocks, a circuit configuration of a controller of the step-up and step-down converter 100 used for a hybrid construction machine according to the second embodiment. As illustrated in this drawing, the step-up and step-down drive control part 120 of the step-up and step-down converter 100 has the voltage control part 121, the current control part 122, a control switching part 123, and a step-up and step-down switching part 124.

The power supply connection terminals 104, the output terminals 106, a step-up PM (Power Module) 125, and a step-down PM 126 are connected to this step-up and step-down drive control part 120. These are connected so as to enable implementation of the hardware configuration illustrated in FIG. 3. That is, these are connected so that the step-up IGBT 102A and the step-down IGBT 102B included in the step-up PM 125 and the step-down PM 126 are PWM-driven by the step-up and step-down drive control part 120 and as a result, the battery voltage Vbat (=vbat_det) and the battery current Ibat (=ibat_det) are output from the power supply connection terminals 104 and the DC bus voltage Vout (=vdc_det) is output from the output terminals 106.

The voltage control part 121 calculates a first switching duty duty_v for controlling the driving of the step-up IGBT 102A and the step-down IGBT 102B by performing PI (Proportional Integral) control based on a difference between a target voltage value Vout_ref and the DC bus voltage Vout output from the output terminals 106. In the process of calculating this first switching duty duty_v, a voltage integral value Vout_I is corrected in the control switching part 123. A description is given below of a technique of this correction.

The current control part 122 calculates a second switching duty duty_i for controlling the driving of the step-up IGBT 102A and the step-down IGBT 102B by performing PI (Proportional Integral) control based on a difference between a current threshold Ibat_ref and the battery current that output from the power supply connection terminals 104. In the process of calculating this second switching duty duty_i, a current integral value Ibat_I is corrected in the control switching part 123. A description is given below of a technique of this correction.

Here, a switching duty for driving the step-up IGBT 102A and a switching duty for driving the step-down IGBT 102B are intended to be distinguished by using signs different from each other for them. Therefore, to each of the first switching duty and the second switching duty, a positive sign is added for driving the step-up IGBT 102A and a negative sign is added for driving the step-down IGBT 102B.

The control switching part 123 selectively performs switching to the voltage control part 121 or the current control part 122 so that a load on the reactor 101 or the inverter 105 is less than or equal to a predetermined load. Specifically, the control switching part 123 performs switching to drive control by the current control part 122 in response to the absolute value of a current flowing through the reactor 101 becoming greater than the current threshold during execution of drive control by the voltage control part 121. Further, the control switching part 123 performs switching to drive control by the voltage control part 121 in response to a terminal voltage value at the output terminals 106 becoming greater than the target voltage value during execution of drive control by the current control part 122.

Such switching between voltage control and current control is performed by a switching part 123A of the control switching part 123. Voltage control is performed when the switching part 123A is connected to the plus (+) and current control is performed when the switching part 123A is connected to the minus (−).

Further, as described above, the control switching part 123 corrects the voltage integral value calculated by the voltage control part 121 using the second switching duty and corrects the current integral value calculated by the current control part 122 using the first switching duty.

A description is given below of correction techniques. Switching parts 123B and 123C of the control switching part 123 are connected to the plus (+) side at the time of voltage control, and the switching parts 123B and 123C are connected to the minus (−) side at the time of current control.

Here, a description is given of correcting the voltage integral value Vout_I and the current integral value Ibat_I. When the voltage control part 121 and the current control part 122 calculate the first switching duty for current control and the second switching duty for voltage control, the duty supplied to the step-up IGBT 102A or the step-down IGBT 102B becomes discontinuous at the time of switching between voltage control and current control because usually a voltage instruction and a current instruction do not match. In the step-up and step-down converter 100 of the hybrid construction machine of the first embodiment, the initial values of the switching duties are corrected using the following conditions (1) and (2) at the time of switching the voltage control part 121 and the current control part 122.

$$\text{Vout\_I is set to (duty\_i−Voutp)} \quad (1)$$

$$\text{Ibat\_I is set to (duty\_v−Ibat\_P)} \quad (2)$$

Here, Vout_I is the voltage integral value calculated in the voltage control part 121, duty_i is the second switching duty calculated in the current control part 122, and Vout_P is the voltage proportional value calculated in the voltage control part 121.

Further, Ibat_I is the current integral value calculated in the current control part 122, duty_v is the first switching duty calculated in the voltage control part 121, and Ibat_P is the current proportional value calculated in the current control part 122.

As illustrated in the condition (1), the control switching part 123 corrects the voltage integral value Vout_I calculated in the voltage control part 121 using the second switching duty duty_i and the voltage proportional value Vout_P. Further, as illustrated in the condition (2), the control switching part 123 corrects the current integral value Ibat_I calculated in the current control part 122 using the first switching duty duty_v and the current proportional value Ibat_P.

In the state of current control, all of the switching parts 123A through 123C of the control switching part 123 are connected to the minus (−) side. In this state, current control is performed with the current control instruction value (duty_i) generated by PI control in the current control part 122 being input to the minus (−) side of the switching part 123A. On the other hand, (duty_i−Vout_P) is input to the plus (+) side of the switching part 123A as a corrected voltage integral value because the minus (−) side is connected in the switching part 123B.

Here, when the current control is switched to voltage control, all of the switching parts 123A through 123C of the control switching part 123 are switched from the minus (−) side to the plus (+) side. As a result, in the switching part 123B, the voltage integral value Vout_I immediately after switching from the minus (−) side to the plus (+) side is set to (duty_i−Vout_P). This voltage integral value Vout_I (=duty_i−Vout_P) is added to the voltage proportional value Vout_P. Accordingly, the first switching duty duty_v becomes a value equal to the second switching duty duty_i obtained at the end of the current control. Thus, at the time of switching the control switching part 123 from the minus (−) side to the plus (+) side, the initial value of the voltage target value after switching is corrected so as to equalize the last value of the voltage control instruction value (second switching duty) before switching with the initial value of the current control instruction value (first switching duty) after switching.

As a result, even when the switching part 123A is switched from the minus (−) side to the plus (+) side at the time of switching from current control to voltage control, the duty values on the plus (+) side and on the minus (−) side of the switching part 123A are the second switching duty duty_i obtained at the end of the current control. Accordingly, it is possible to eliminate discontinuity at the time of switching to voltage control.

Likewise, when voltage control is switched to current control, in the switching part 123C, the current integral value Ibat_I immediately after switching from the plus (+) side to the minus (−) side is set to (duty_v−Ibat_P). This current integral value Ibat_I (=duty_v−Ibat_P) is added to the current proportional value Ibat_P. Accordingly, the second switching duty duty_i becomes a value equal to the first switching duty duty_v obtained at the end of the voltage control. Thus, at the time of switching the control switching part 123 from the plus (+) side to the minus (−) side, the initial value of the voltage target value after switching is corrected so as to equalize the last value of the current control instruction value (first switching duty) before switching with the initial value of the voltage control instruction value (second switching duty) after switching.

As a result, even when the switching part 123A is switched from the plus (+) side to the minus (−) side at the time of switching from voltage control to current control, the duty values on the plus (+) side and on the minus (−) side of the switching part 123A are the first switching duty duty_v obtained at the end of the voltage control. Accordingly, it is possible to eliminate discontinuity at the time of switching to current control.

By switching the switching part 123A as described above, the control switching part 123 selects the first switching duty obtained from the voltage control part 121 and the second switching duty obtained from the current control part 122 as a driving duty duty_ref for driving the step-up PM 125 and the step-down PM 126. This selection is implemented by switching to drive control by the current control part 122 (that is, the second switching duty) in response to the battery current Ibat exceeding the power supply current threshold Ibat_ref and returning to a drive control part by the voltage control part 121 (that is, the first switching duty) in response to the DC bus voltage Vout returning to the output target voltage value Vout_ref.

The selected driving duty duty_ref is transmitted to the step-up and step-down switching part 124. This driving duty duty_ref is either the first switching duty or the second switching duty. Therefore, a positive sign is added to a driving duty for step-up driving and a negative sign is added to a driving duty for step-down driving.

The step-up and step-down switching part 124 decides on one of the step-up PM 125 and the step-down PM 126 to be a power module to be driven by this driving duty duty_ref transmitted from the control switching part 123 based on the sign of the driving duty duty_ref.

The step-up PM (Power Module) 125 is a power module in which the above-described step-up IGBT 102A, a driving circuit for driving this step-up IGBT 102A, and a self-protection function are incorporated.

Likewise, the step-down PM 126 is a power module in which the above-described step-down IGBT 102B, a driving circuit for driving this step-down IGBT 102B, and a self-protection function are incorporated.

Although the reactor is not illustrated in FIG. 4, the battery current Ibat output from the power supply connection terminals 104 is a current that flows through the reactor.

Since a negative driving duty duty_ref is transmitted from the step-up and step-down switching part 124 to the step-down IGBT 102B included in the step-down PM 126 as described above, its sign is reversed (multiplied by −1).

Figure 5:
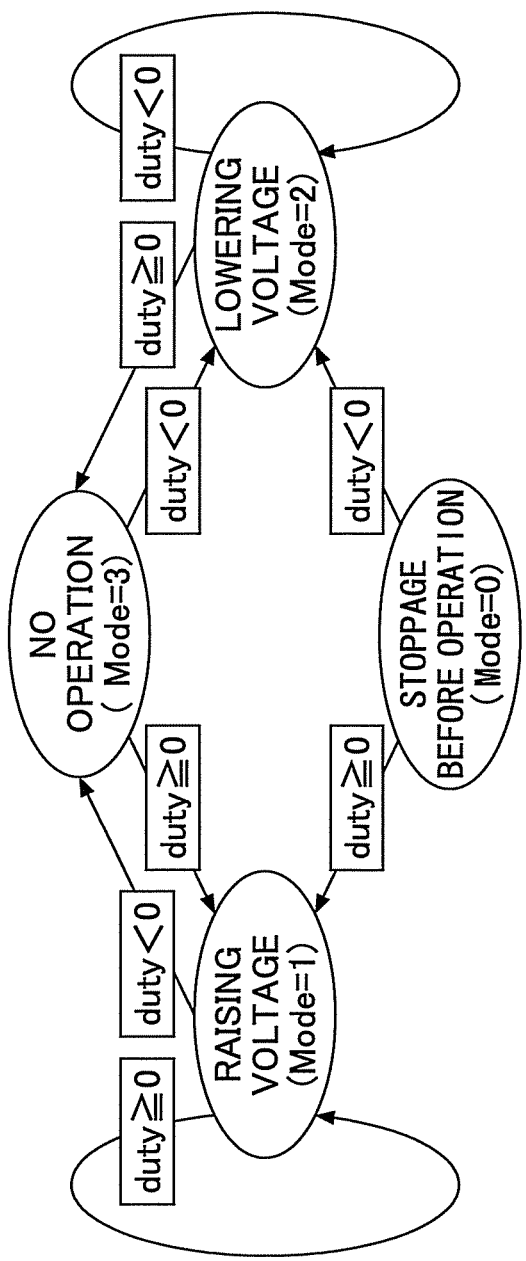
FIG. 5 is a conceptual diagram illustrating state transitions at the time of switching a step-up and a step-down operation by a step-up and step-down switching part.

FIG. 5 is a conceptual diagram illustrating state transitions at the time of switching a step-up and a step-down operation by the step-up and step-down switching part 124. Table 1 illustrates the relationship between the state transitions illustrated in FIG. 5 and driving duties. Here, for convenience of description, it is assumed that Mode 0 (Mode=0) is a stoppage before the start of an operation, Mode 1 (Mode=1) is raising voltage, Mode 2 (Mode=2) is lowering voltage, and Mode 3 (Mode=3) is no operation (a stoppage during switching of raising voltage and lowering voltage).

TABLE 1

| Current Mode | Current Driving Duty | Next Mode |
|---|---|---|
| 0 | duty ≥ 0 | 1 |
|   | duty < 0 | 2 |
| 1 | duty ≥ 0 | 1 |
|   | duty < 0 | 3 |
| 2 | duty ≥ 0 | 3 |
|   | duty < 0 | 2 |
| 3 | duty ≥ 0 | 1 |
|   | duty < 0 | 2 |

As illustrated in FIG. 5 and Table 1, if the driving duty is greater than or equal to 0 at the time of the start of the operation (Mode 0) of the step-up and step-down converter 100, the step-up and step-down switching part 124 causes the driving control of the step-up PM 125 to be executed. On the other hand, if the driving duty is a negative value, the step-up and step-down switching part 124 causes the voltage control part 121 to execute the driving control of the step-down PM 126.

Further, if the driving duty is greater than or equal to 0 while the driving control of the step-up PM 125 is being performed (Mode 1), the step-up and step-down switching part 124 causes the driving control of the step-up PM 125 to be continued. On the other hand, if the driving duty is a negative value, the step-up and step-down switching part 124 causes the driving control of the step-up PM 125 to be stopped.

Further, if the driving duty is greater than or equal to 0 while the driving control of the step-down PM 126 is being performed (Mode 2), the step-up and step-down switching part 124 causes the driving control of the step-down PM 126 to be stopped. On the other hand, if the driving duty is a negative value, the step-up and step-down switching part 124 causes the driving control of the step-down PM 126 to be continued.

Further, if the driving duty is greater than or equal to 0 while the driving control by the voltage control part 121 and the driving control by the current control part 122 are both stopped during the switching of raising voltage and lowering voltage (Mode 3), the step-up and step-down switching part 124 causes the driving control of the step-up PM 125 to be executed. On the other hand, if the driving duty is a negative value, the step-up and step-down switching part 124 causes the driving control of the step-down PM 126 to be executed.

The step-up and step-down switching part 124 causes the driving duty to be OFF in the stoppage period in Mode 3.

Figure 6:
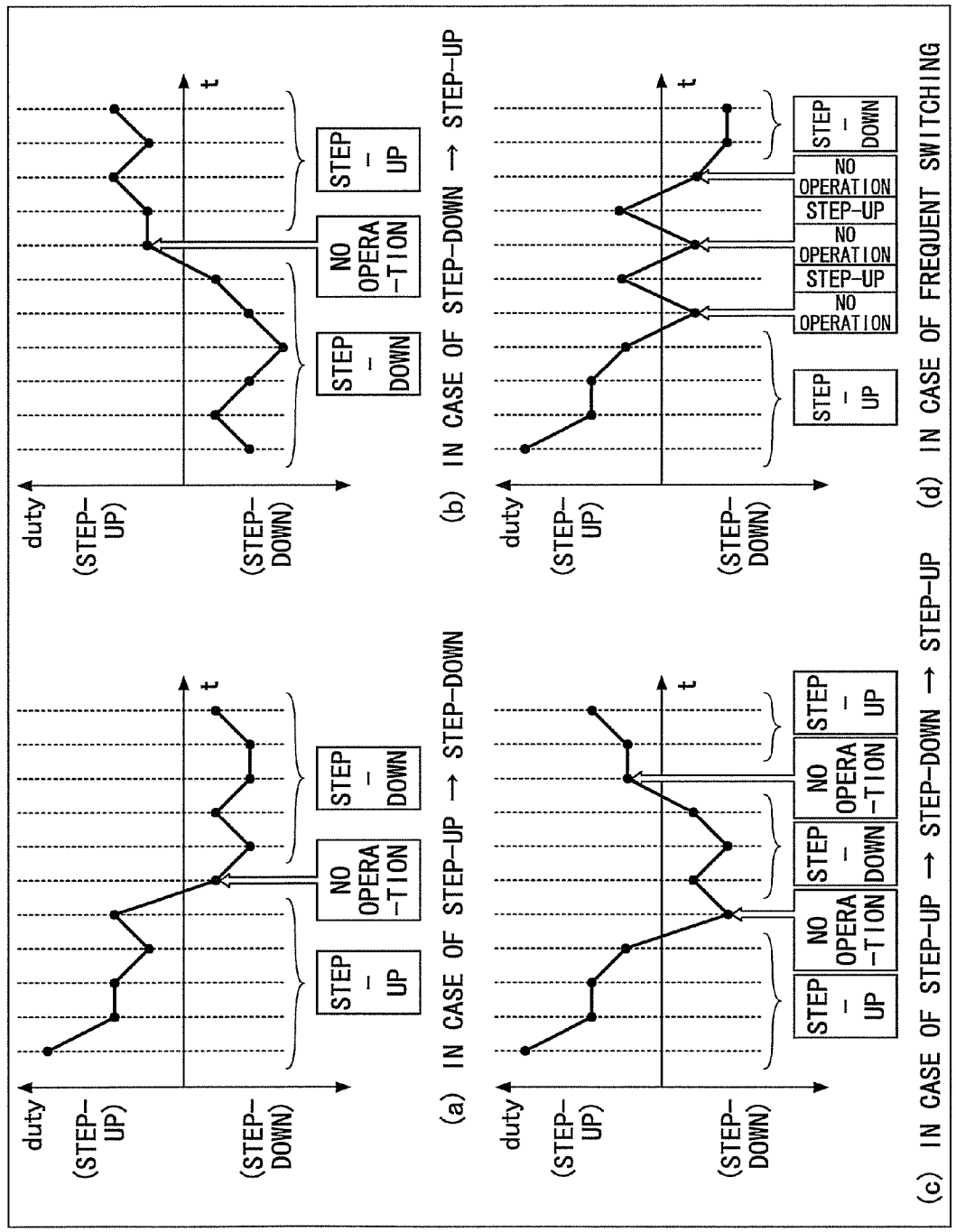
FIG. 6 is an explanatory diagram of operations, illustrating the state transitions illustrated in FIG. 5 in a time-series manner.

FIG. 6 is an explanatory diagram of operations, illustrating the state transitions illustrated in FIG. 5 in a time-series manner.

FIG. 6(*a*) illustrates an operation in the case of a transition from a step-up operation to a step-down operation via no operation. A time of no operation where the driving duty is OFF (above-described Mode 3) is thus provided between the step-up operation and the step-down operation. For example, in the case of performing step-up or step-down control every 200 μs, a stoppage period due to no operation is provided for only 200 μs during which the step-up operation switches to the step-down operation. This achieves a stable operation at the time of step-up and step-down switching.

Likewise, FIG. 6(*b*) illustrates an operation in the case of a transition from a step-down operation to a step-up operation via no operation. FIG. 6(*c*) illustrates an example in the case of a transition from a step-up operation to a step-down operation via no operation and to a step-up operation again via no operation. As well as the case illustrated in FIG. 6(*a*), these illustrate various cases where the state of no operation is gone through in the case of a transition from a step-up operation to a step-down operation.

FIG. 6(*d*) illustrates an operation in the case where the switching of a step-up operation and a step-down operation is frequently performed. The case where the switching of raising voltage and lowering voltage is thus frequently performed includes the case of a transition from a step-up operation to another step-up operation via no operation in addition to the switching of a step-up operation and a step-down operation. Since the time of no operation is as short as one period (200 μs) of the control cycle, it is possible to achieve stable step-up and step-down control in the case of thus returning to the same operation as well.

Figure 7:
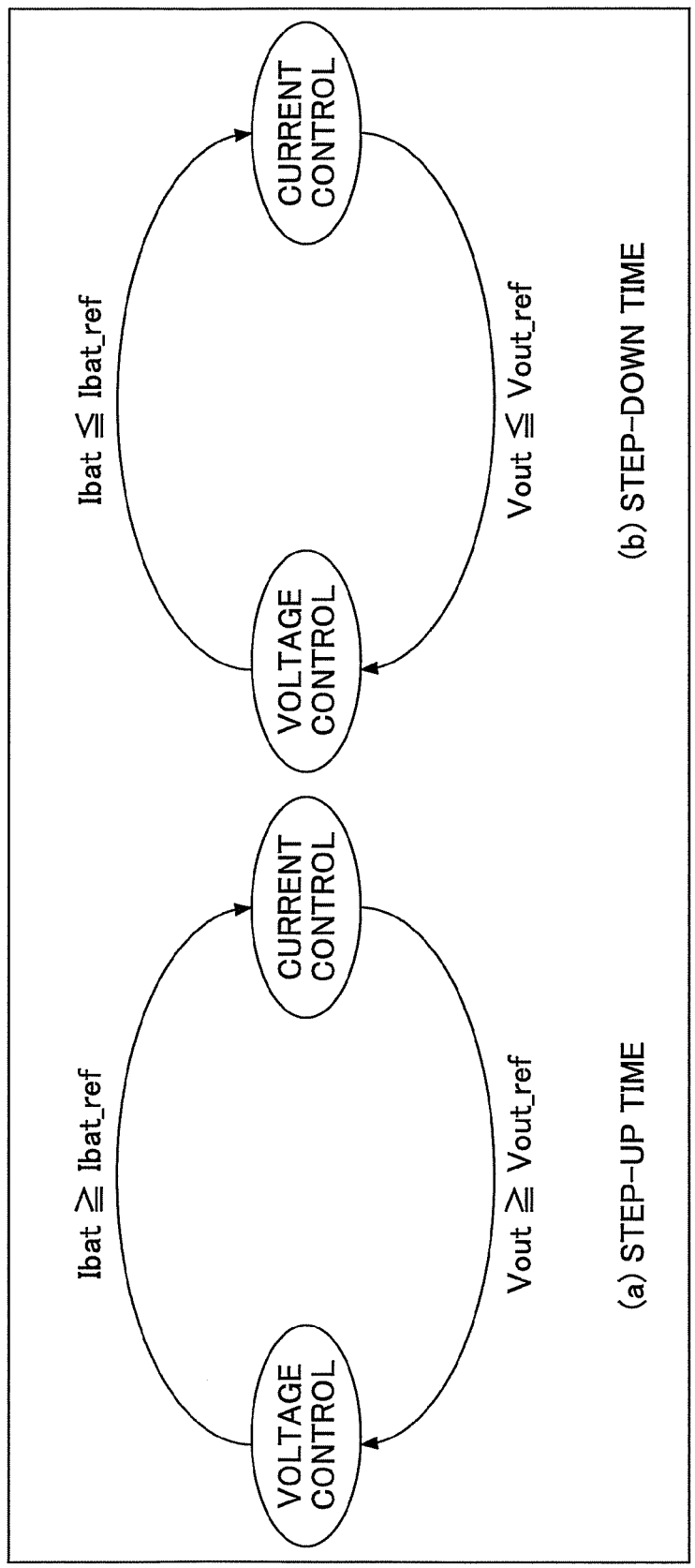
FIG. 7 is a conceptual diagram illustrating the condition of the switching of voltage control and current control.
Figure 8:
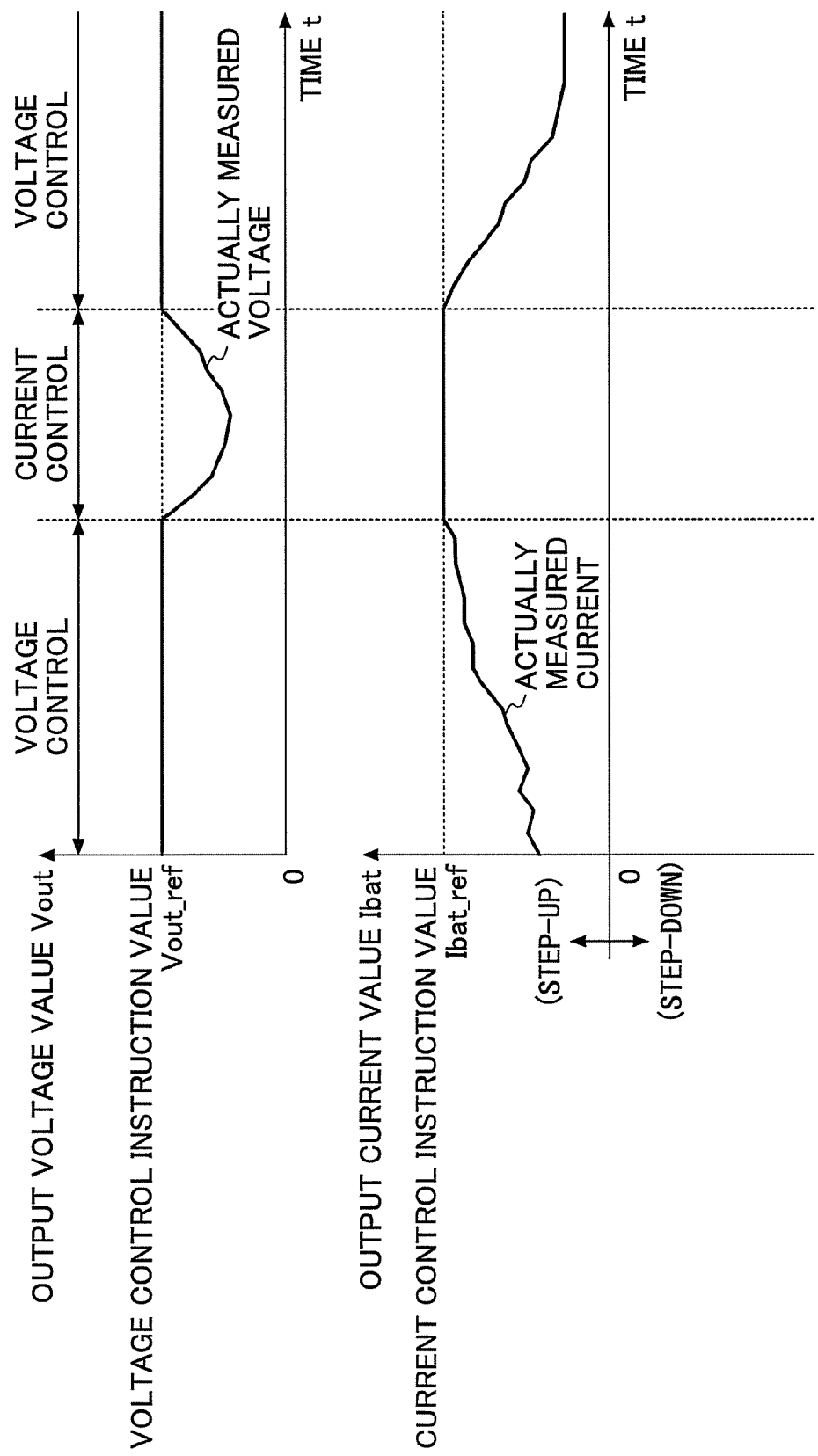
FIG. 8 is a diagram illustrating an operation for describing the operation of switching voltage control and current control during a step-up operation.
Figure 9:
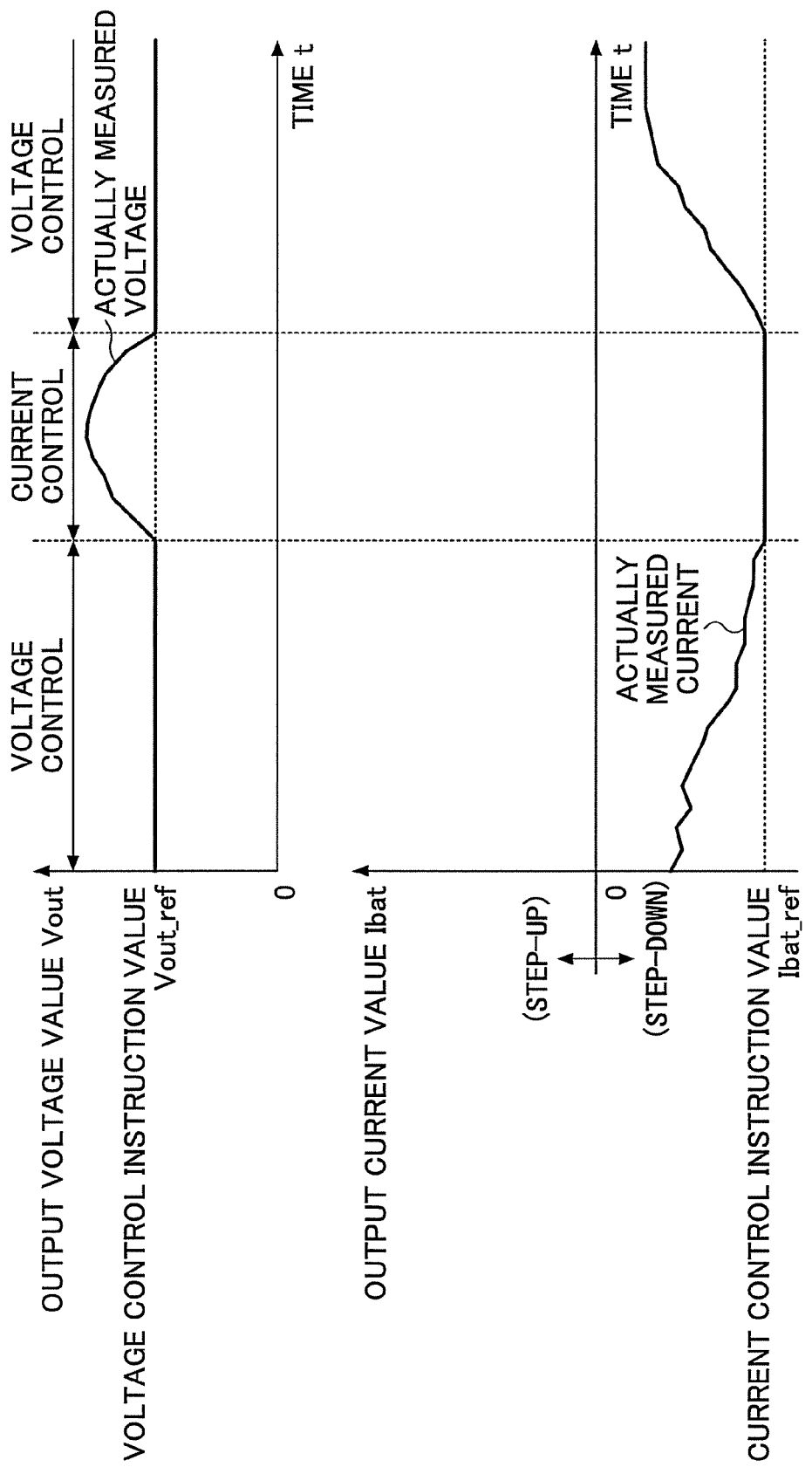
FIG. 9 is a diagram illustrating an operation for describing the operation of switching voltage control and current control during a step-down operation.

FIG. 7 is a conceptual diagram illustrating the condition of the switching of voltage control and current control. FIG. 8 is a diagram illustrating an operation for describing the operation of switching voltage control and current control during a step-up operation. FIG. 9 is a diagram illustrating an operation for describing the operation of switching voltage control and current control during a step-down operation. These operations of switching voltage control and current control are executed by the control switching part 123.

As illustrated in FIG. 7(*a*), if the current value of the battery current Ibat becomes greater than or equal to the power-supply supply current threshold Ibat_ref while the voltage control by the voltage control part 121 is being performed during a step-up operation, the control switching part 123 performs switching to drive control by the current control part 122 in order to prevent an overcurrent in the direction toward the output terminals 106 from flowing through the reactor 101. This corresponds to the case of the initial transition from voltage control to current control in the time series illustrated in FIG. 8.

For example, if the inverter 105 consumes a large amount of power, that is, if the amount of electric driving of the motor generator 12 or the amount of power running of the rotation electric motor 21 is large, an overcurrent larger than an allowable current value may flow through the reactor 101 and other circuit elements to damage them. Therefore, if the current value of the battery current Ibat flowing through the reactor 101 becomes greater than or equal to the power-supply supply current threshold Ibat_ref, switching to the drive control by the current control part 122 is performed.

Further, when switching to the drive control by the current control part 122 is performed, it is impossible to allow current larger than or equal to the amount requested by the motor generator 12 or the rotation electric motor 21 to flow. Therefore, the operation is continued while consuming the electric power stored in the DC bus 110. Accordingly, as illustrated in FIG. 8, the DC bus voltage Vout starts to drop significantly from the output target voltage value Vout_ref. This does not change unless the state of the load of the inverter 105 changes.

Then, if the DC bus voltage Vout returns to the output target voltage value Vout_ref because of a decrease in the amount of electric driving of the motor generator 12 or the amount of power running of the rotation electric motor 21 while the drive control by the current control part 122 is being performed, that is, if the DC bus voltage Vout becomes greater than or equal to the output target voltage value Vout_ref, the control switching part 123 performs switching to the drive control by the voltage control part 121. This corresponds to the case of a transition from the current control to the last voltage control in the time series illustrated in FIG. 8. This makes it possible to prevent the voltage value of the DC bus 110 from being excessively high. As a result, it is possible to stabilize the voltage value of the DC bus 110 and to stabilize the controllability of the inverters 18 and 20.

On the other hand, as illustrated in FIG. 7(*b*), an overcurrent larger than an allowable current value may also flow through the reactor 101 and other circuit elements to damage them if, for example, the amount of power generation of the motor generator 12 or the amount of regeneration of the rotation electric motor 21 is large while the voltage control by the voltage control part 121 is being performed during a step-down operation. Therefore, if the battery current that becomes less than or equal to the power-supply supply current threshold Ibat_ref, the control switching part 123 performs switching to the drive control by the current control part 122 in order to prevent an overcurrent in the direction toward the power supply connection terminals 104 from flowing through the reactor 101. This corresponds to the case of the initial transition from voltage control to current control in the time series illustrated in FIG. 9. Here, the battery current Ibat and the power-supply supply current threshold Ibat_ref during a step-down operation have negative values.

Further, if the DC bus voltage Vout returns to the output target voltage value Vout_ref while the drive control by the current control part 122 is being performed, that is, if the DC bus voltage Vout becomes less than or equal to the output target voltage value Vout_ref, the switching control switching part 123 performs switching to the drive control by the voltage control part 121. This corresponds to a transition from the current control to the last voltage control in the time series illustrated in FIG. 9. As a result, it is possible to stabilize the voltage value of the DC bus 110 and to stabilize the controllability of the inverters 18 and 20.

As described above, according to the hybrid construction machine of the second embodiment, a voltage integral value is calculated in the voltage control part 121 using the second switching duty calculated in the current control part 122, and a current integral value is calculated in the current control part 122 using the first switching duty calculated in the voltage control part 121. Then, if the absolute value of the battery current Ibat exceeds the power-supply supply current threshold Ibat_ref, switching to the drive control by the current control part 122 is performed, and if the DC bus voltage Vout returns to the output target voltage value Vout_ref, returning to the drive control part by the voltage control part 121 is performed.

Thus, while basing on voltage control, switching to current control is performed to protect a circuit if the battery current Ibat becomes excessively large. Then, a stoppage period (no operation) where both the step-up IGBT 102A and the step-down IGBT 102B are stopped is provided at the time of the switching. Therefore, it is possible to provide a hybrid construction machine capable of stably switching a step-up operation and a step-down operation without damaging the step-up IGBT 102A and the step-down IGBT 102B.

In the above, a description is given of a configuration where the inverter 105 is directly connected to the output terminals 106. Alternatively, a motor AC-driven via an inverter may be connected to the output terminals 106.

In the case of performing feedback control on the step-up and step-down converter 100, there is a problem in that a delay in the rise of current in a region of small current values (a low current region) close to the switching point of a step-up operation and a step-down operation causes a delay in the response of current to a duty instruction.

Figure 15:
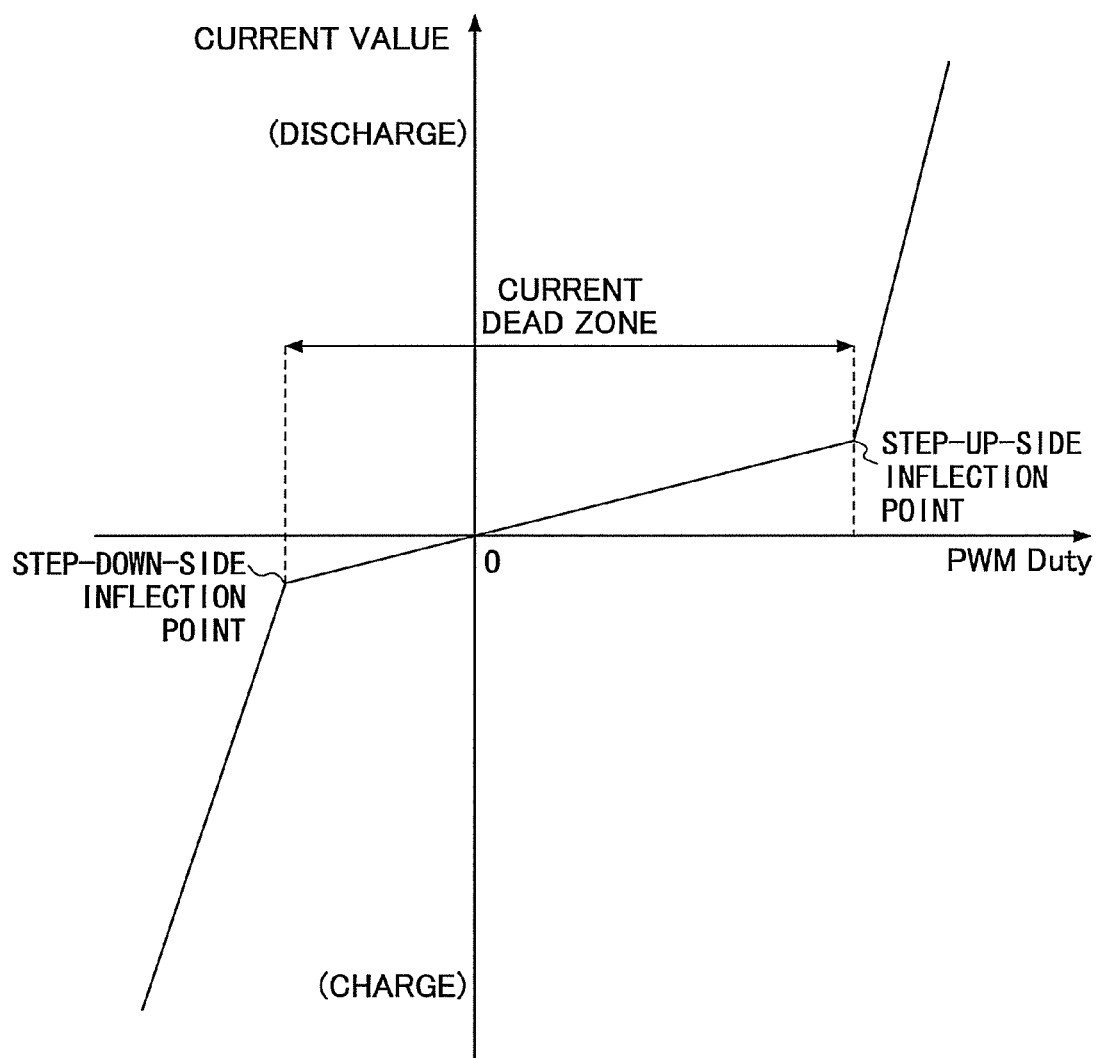
FIG. 15 is a diagram illustrating the amount of variation in current relative to a PWM duty in a conventional drive controller of a step-up and step-down converter.

Such a delay in current response appears as a dead zone as illustrated in FIG. 15 in the current characteristic with respect to the duty instruction. In this dead zone, current values are small. Therefore, a step-up operation or a step-down operation is not properly performed, so that the voltage value of a DC bus provided between a step-up and step-down converter and a load such as a motor generator is subject to variations. Therefore, a variation in the DC bus voltage value in the dead zone also causes a variation in the voltage supplied from the DC bus to the load, thus causing a problem in that it is difficult to control the load such as a motor generator with accuracy.

Further, if the DC bus voltage rises excessively because of a delay in current response at the time of performing a step-down operation, the driver of the load such as a motor generator may be damaged by overvoltage. On the other hand, if the DC bus voltage lowers excessively to be equal to the voltage of a charge storage at the time of performing a step-up operation, there is a problem in that current flows constantly from the charge storage to the load so as to make it difficult to control the load such as a motor generator.

Therefore, in a third embodiment, a hybrid construction machine is provided that uses a step-up and step-down converter capable of performing a step-up operation and a step-down operation without damaging switching devices and improved in responsiveness near the switching point of the step-up operation and the step-down operation.

[Third Embodiment]

A hybrid construction machine according to the third embodiment uses the same step-up and step-down converter 100 as in the first embodiment. Therefore, in the third embodiment, FIG. 3 is referred to. The third embodiment is different from the first embodiment in using a drive control part 200 in place of the step-up and step-down drive control part 120 of the first embodiment illustrated in FIG. 2.

In the step-up and step-down converter 100, at the time of raising the voltage of the DC bus 110, a PWM voltage is applied to the gate terminal of the step-up IGBT 102A so as to supply the induced electromotive force generated in the reactor 101 with the turning ON and OFF of the step-up IGBT 102A to the DC bus 110 via the diode 102b connected in parallel to the step-down IGBT 102B. As a result, the voltage of the DC bus 110 is raised.

Further, in the case of lowering the voltage of the DC bus 110, a PWM voltage is applied to the gate terminal of the step-down IGBT 102B so as to supply regenerated electric power fed from the inverter 105 to the battery 19 from the DC bus 110 via the step-down IGBT 102B. As a result, the battery 19 is charged with the electric power stored in the DC bus 110, so that the voltage of the DC bus 110 is lowered.

At the time of the power running operation of the regenerative operation of a motor 91, electric power necessary for the power running operation is supplied from the DC bus 110 to the motor 91 via the inverter 105, and the electric power obtained by the regenerative operation is supplied from the motor 91 to the DC bus 110 via the inverter 105. Therefore, the voltage value of the DC bus 110 varies.

However, according to the hybrid construction machine of the third embodiment, the responsiveness of current near the switching point of a step-up operation and a step-down operation is improved by the control technique described below, thereby keeping the voltage value of the DC bus 110 within a certain range.

Figure 10:
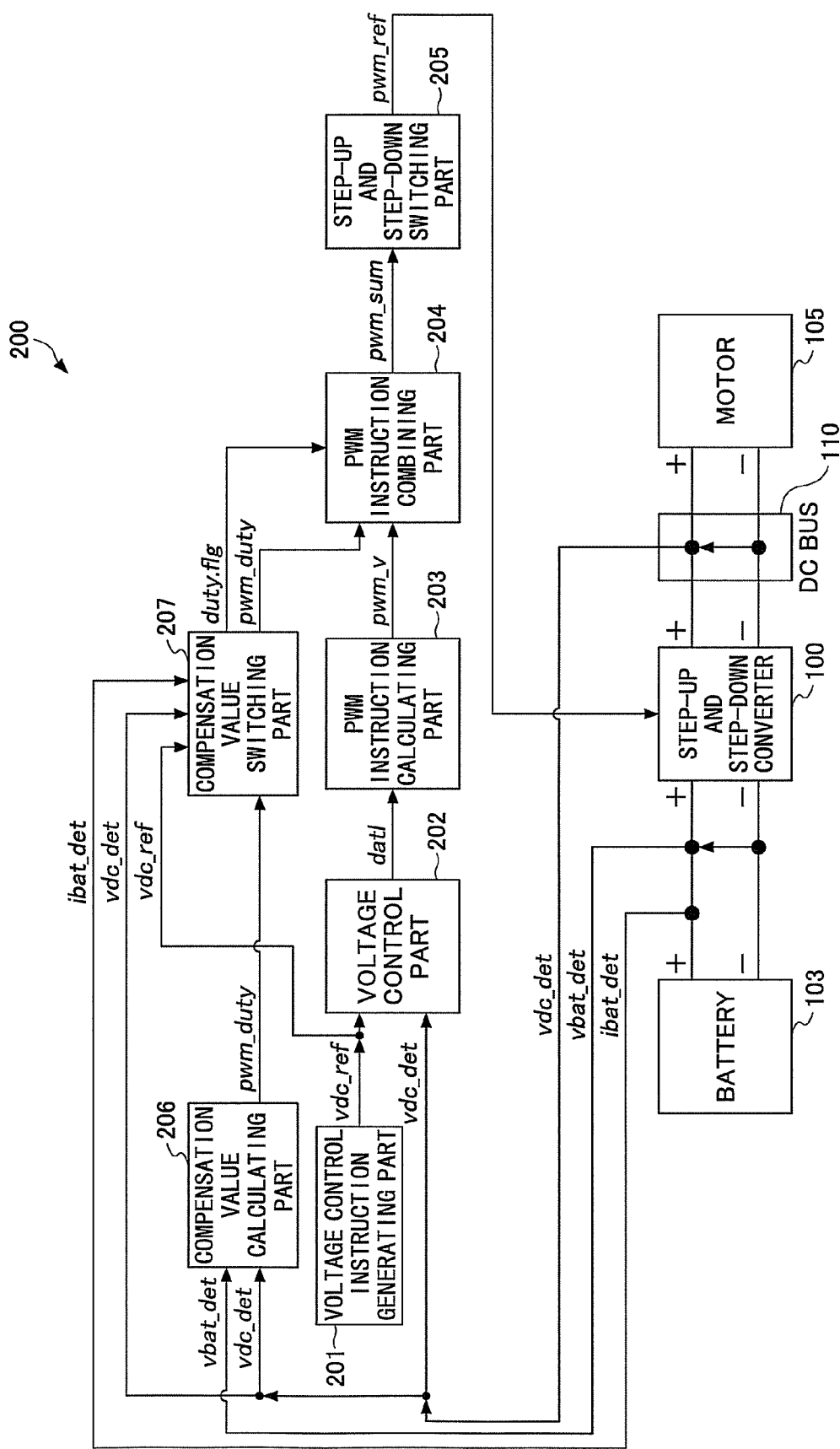
FIG. 10 is a control block diagram illustrating a circuit configuration of a drive controller of a step-up and step-down converter of a hybrid construction machine of a third embodiment.

FIG. 10 is a control block diagram illustrating a circuit configuration of a drive controller of a step-up and step-down converter of the hybrid construction machine of the third embodiment. As illustrated in this drawing, the drive control part 200 of the step-up and step-down converter of the third embodiment, which replaces the step-up and step-down drive control part 120 in the first embodiment, includes a voltage control instruction generating part 201, a voltage control part 202, a PWM instruction calculating part 203, a PWM instruction combining part 204, a step-up and step-down switching control part 205, a compensation value calculating part 206, and a compensation value switching part 207.

Of these, the voltage control instruction generating part 201, the voltage control part 202, the PWM instruction calculating part 203, the PWM instruction combining part 204, and the step-up and step-down switching part 205 form a feedback loop that generates a driving instruction for driving the step-up and step-down converter 100 by PI control based on a deviation between the DC bus voltage value (vdc_det) and a DC bus target voltage value (vdc_ref). This feedback loop operates as a main control part for generating a driving instruction.

Further, the PWM instruction combining part 204, the compensation value calculating part 206, and the compensation value switching part 207 form a feedforward loop for calculating a compensation value for compensating for the driving instruction of the step-up and step-down converter 100 using the DC bus voltage value (vdc_det), the battery voltage value (vbat_det), and the battery current value (ibat_det), and combining this compensation value with the driving instruction.

The direction of a flow from the battery 19 to the DC bus 110 is a forward direction with respect to the battery current value (ibat_det).

[Description of Each Part]

The voltage control instruction generating part 201 outputs the DC bus target voltage value (vdc_ref) that serves as a target voltage for the DC bus 110. The DC bus voltage before the start of the driving of the motor 91 is 0 (V). Therefore, this DC bus target voltage value (vdc_ref) is determined so as to gradually increase from 0 (V) in response to the start of the driving of the motor 91 and to be maintained at a constant value in response to the DC bus voltage exceeding a predetermined value after the driving of the motor 91 has been started up. The DC bus target voltage value (vdc_ref) is input to the voltage control part 202 and the compensation value switching part 207.

The voltage control part 202 performs PI control so as to bring the DC bus voltage value (vdc_det) close to the DC bus target voltage value (vdc_ref) (that is, so as to reduce their deviation), and calculates a voltage control instruction (datl) necessary for this. The generated voltage control instruction (datl) is input to the PWM instruction calculating part 203.

The PWM instruction calculating part 203 performs calculation for converting the voltage control instruction (datl) into a PWM voltage instruction value (pwm_v) representing a duty value necessary for PWM control. The calculated PWM voltage instruction value (pwm_v) is input to the PWM instruction combining part 204.

The PWM instruction combining part 204 performs a combining operation (a function as a combining part), where the PWM instruction combining part 204 sums up the PWM voltage instruction value (pwm_v) input from the PWM instruction calculating part 203 and a compensation duty value (pwm_duty) input from the compensation value calculating part 206 in accordance with the value of a flag (duty.flg) input from the compensation value switching part 207 and outputs a combined duty value (pwm_sum). In this combining operation, the technique for combining the PWM voltage instruction value (pwm_v) and the compensation duty value (pwm_duty) is changed in accordance of the value of the flag (duty.flg) by the dead zone compensating function of the PWM instruction combining part 204. A description is given below of the combining operation based on this dead zone compensating function.

The combined duty value (pwm_sum) output by the PWM instruction combining part 204 is the amount of control (%) before conversion into a PWM duty value.

The step-up and step-down switching control part 205 converts the combined duty value (pwm_sum) into a duty instruction value (pwm_ref), which is a PWM duty value. This duty instruction value (pwm_ref) is a value (%) representing a PWM duty for driving the step-up IGBT 102A and the step-down IGBT 102B of the step-up and step-down converter 100.

Here, with respect to the duty instruction value (pwm_ref), a positive sign is added to a value for raising voltage and a negative sign is added to a value for lowering voltage, thereby distinguishing between the value for raising voltage and the value for lowering voltage. Therefore, the step-up and step-down switching part 205 transmits the duty instruction value (pwm_ref) to the step-up IGBT 102A if the duty instruction value (pwm_ref) is a positive value, and transmits the duty instruction value (pwm_ref) to the step-down IGBT 102B if the duty instruction value (pwm_ref) is a negative value.

The compensation value calculating part 206 calculates the compensation duty value (pwm_duty) necessary for the combining operation based on the dead zone compensating function for compensating for the PWM voltage instruction value (pwm_v), based on the DC bus voltage value (vdc_det), the battery voltage value (vbat_det), and the battery current value (ibat_det). This compensation duty value (pwm_duty) is the amount of control corresponding to a PWM duty value representing the inflection point on the step-up side or the step-down side in the current characteristic relative to the PWM duty of the step-up and step-down converter 100 (see FIG. 15). The step-down-side value of the amount of control corresponding to a PWM duty value representing the inflection point is given by (vbat_det)/(vdc_det), which is the ratio of the battery voltage value (vbat_det) to the DC bus voltage value (vdc_det), and the step-up-side value is given by {1−(vbat_det)/(vdc_det)}. The compensation value calculating part 206 calculates the amount of control representing (vbat_det)/(vdc_det), which is the ratio of the battery voltage value (vbat_det) to the DC bus voltage value (vdc_det), as the compensation duty value (pwm_duty), and inputs it to the compensation value switching part 207.

The compensation value switching part 207 derives the flag (duty.flg) based on the DC bus target voltage value (vdc_ref), the DC bus voltage value (vdc_det), and the battery current value (ibat_det), and inputs this flag (duty.flg) and the compensation duty value (pwm_duty) to the PWM instruction combining part 204. The flag (duty.flg) takes one of the values of "−1," "0," and "+1." This flag (duty.flg) is used for the below-described combining operation based on the dead zone compensation function.

Figure 11:
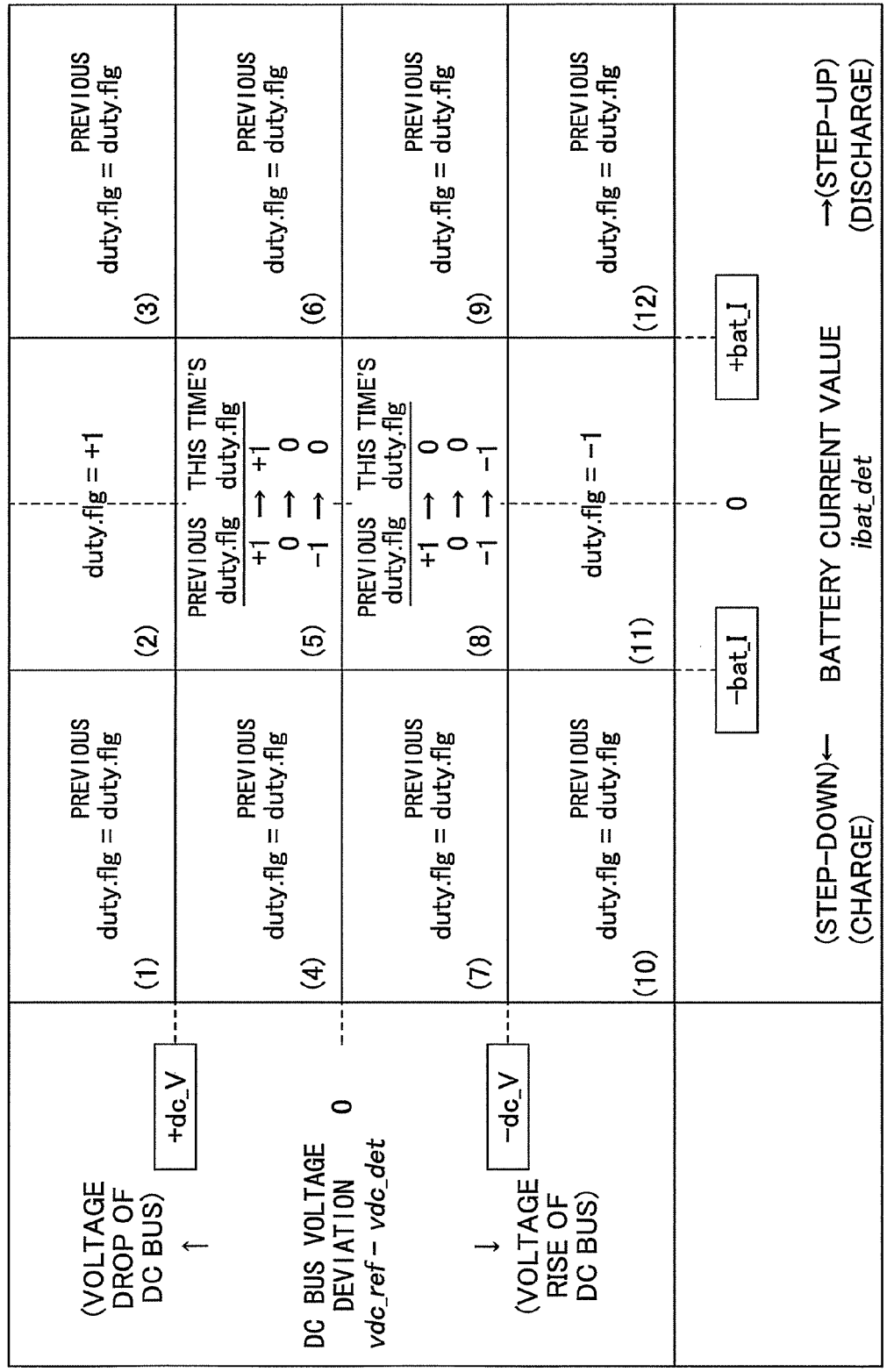
FIG. 11 is a diagram illustrating the relationship between a flag derived in a compensation value switching part of the drive controller of the step-up and step-down converter and the driving region of the step-up and step-down converter of the hybrid construction machine of the third embodiment.

FIG. 11 is a diagram illustrating the relationship between the flag (duty.flg) derived in the compensation value switching part 207 of the drive controller of the step-up and step-down converter and the driving region of the step-up and step-down converter 100 of the hybrid construction machine of the third embodiment.

In FIG. 11, the horizontal axis is the battery current value (ibat_det), and the vertical axis is a DC bus voltage deviation {DC bus target voltage value (vdc_ref)−DC bus voltage value (vdc_det)}.

Here, the direction of a flow from the battery 19 to the DC bus 110 is a forward direction with respect to the battery current value (ibat_det). Therefore, a region where the horizontal axis is positive is a region where the voltage of the DC bus 110 is raised (electric power is supplied from the reactor 101 to the DC bus 110). If this operation is continued, the electric power stored in the battery 19 is supplied to the DC bus 110 (the electric charge is released from the battery 19 to the DC bus 110). On the other hand, a region where the horizontal axis is negative is a region where the voltage of the DC bus 110 is lowered (the battery 19 is charged).

Further, the DC bus voltage deviation of the vertical axis is expressed by {DC bus target voltage value (vdc_ref)−DC bus voltage value (vdc_det)}. Therefore, a region where the vertical axis is positive is a region where the DC bus voltage value (vdc_det) is lower than the DC bus target voltage value (vdc_ref) so that there is a drop in the voltage of the DC bus 110. In this region, the DC bus voltage value (vdc_det) is lowered by a variation in a load such as a motor, and the step-up and step-down converter 100 therefore performs control for increasing the DC bus voltage value (vdc_det). As a result, the electric charge is released from the battery 19 to the DC bus 110. On the other hand, a region where the vertical axis is negative is a region where the DC bus voltage value (vdc_det) is higher than the DC bus target voltage value (vdc_ref) so that there is a rise in the voltage of the DC bus 110. In this region, the DC bus voltage value (vdc_det) rises because of a variation in a load such as a motor, and the step-up and step-down converter 100 therefore performs control for charging the battery 19 in order to reduce the DC bus voltage value (vdc_det).

Two thresholds −bat_I and +bat_I are set across the center axis of battery current value (ibat_det) =0 from each other on the horizontal axis. As a result, the driving region of the step-up and step-down converter 100 is divided into three regions of battery current value (ibat_det)≤−bat_I, −bat_I<battery current value (ibat_det)<+bat_I, +bat_I±battery current value (ibat_det) in accordance with the battery current value (ibat_det) along the horizontal axis. Between the two predetermined thresholds −bat_I and +bat_I is a region of small current values where the dead zone (see FIG. 15) would be generated in the conventional step-up and step-down converter.

Further, three predetermined thresholds of −dc_V, 0, and +dc_V of the DC bus voltage deviation {DC bus target voltage value (vdc_ref)−DC bus voltage value (vdc_det)} are set on the vertical axis. As a result, the driving region of the step-up and step-down converter 100 is divided into four regions of DC bus voltage deviation≤−dc_V, −dc_V<DC bus voltage deviation<0, 0≤DC bus voltage deviation <+dc_V, and +dc_V≤DC bus voltage deviation in accordance with the DC bus voltage deviation along the vertical axis.

Here, the predetermined thresholds on the vertical axis are determined in accordance with control accuracy based on the characteristics of the DC bus 110. The larger the threshold +dc_V, less likely it is for switching to occur, thus causing the overvoltage of the DC bus 110. On the other hand, the smaller the threshold +dc_V, more frequently switching occurs, thus causing excessive current compensation. This results in greater loss of current flowing through the DC bus 110. The same applies to the absolute value of the threshold −dc_V.

Thus, by setting thresholds on the horizontal axis and the vertical axis, the driving region of the step-up and step-down converter 100 is divided into twelve regions (1) through (12) arranged in a matrix as illustrated in FIG. 11. When the step-up and step-down converter 100 is driven, the driving region makes transitions in (1) through (12) because the battery current value (ibat_det) and the DC bus voltage deviation {DC bus target voltage value (vdc_ref)−DC bus voltage value (vdc_det)} vary. Thereby, not only is it possible to easily make determination as to switching to a different processing mode, but also it is possible to swiftly start the dead zone compensating function.

As described above, the flag (duty.flg) is a flag used for the below-described combining operation based on the dead zone compensating function. If the flag (duty.flg) is "+1," this indicates that the dead zone compensating function is active during a step-up operation. If the flag (duty.flg) is "−1," this indicates that the dead zone compensating function is active during a step-down operation. Further, if the flag (duty.flg) is "0," this indicates that the dead zone compensating function is canceled. The dead zone function becomes active when its activation is started, and becomes canceled when it is deactivated.

[Description of Driving Regions (1)-(12)]

Region (1) is a driving region of "battery current value (ibat_det)≤−bat_I and +dc_V≤DC bus voltage deviation." Even when the driving region has made a transition to Region (1), it is possible to use the same flag because it is a region remote from the switching of charging and discharging, that is, it is a region remote from the current dead zone of the DC bus 110. Specifically, the flag (duty.flg) is set to the same value as the (previous) flag (duty.flg) before transition (duty.flg=previous duty.flg).

Region (2) is a driving region of "−bat_I<battery current value (ibat_det)<+bat_I and +dc_V≤DC bus voltage deviation." When the driving region has made a transition to Region (2), the flag (duty.flg) is set to "+1" (duty.flg=+1). Here, the flag (duty.flg) is set to "+1" when a transition has been made to Region (2). This is for furthering a step-up operation by increasing the battery current value (ibat_det) by starting to activate the dead zone compensating function because if the absolute value of the battery current value (ibat_det) is less than a threshold and the DC bus voltage deviation is more than or equal to the threshold (+dc_V) during a step-up operation, this is the state where current does not flow sufficiently although the DC bus voltage value (vdc_det) is relatively low so that it is necessary to raise the voltage of the DC bus 110. Here, the flag (duty.flg) is switched to "+1," for example, when the DC bus voltage deviation increases from the state where the flag (duty.flg) is "0" in Region (5) to exceed +dc_V to enter Region (2). Thereby, in performing charging and discharging control based on the DC bus voltage deviation, the below-described operation of compensating for the PWM voltage instruction value (pwm_v) is started in order to force current to flow in the dead zone of the DC bus 110.

Region (3) is a driving region of "+bat_I≤battery current value (ibat_det) and +dc_V≤DC bus voltage deviation." When the driving region has made a transition to Region (3), the flag (duty.flg) is set to the same value as the (previous) flag (duty.flg) before transition (duty.flg=previous duty.flg).

Region (4) is a driving region of "battery current value (ibat_det)≤−bat_I and 0≤DC bus voltage deviation <+dc_V." When the driving region has made a transition to Region (4), the flag (duty.flg) is set to the same value as the (previous) flag (duty.flg) before transition (duty.flg=previous duty.flg).

Region (5) is a driving region of "−bat_I<battery current value (ibat_det)<+bat_I and 0≤DC bus voltage deviation <+dc_V." That is, Region (5) corresponds to a transition region where the DC bus voltage deviation is small and charging and discharging switch with respect to the battery current value (ibat_det). When the driving region has made a transition to Region (5), the flag (duty.flg) (of this time) is set to "0" if the (previous) flag (duty.flg) before transition is "−1" or "0," and the flag (duty.flg) (of this time) is set to the same value "+1" as the (previous) flag (duty.flg) before transition if the (previous) flag (duty.flg) is "+1."

Here, when a transition has been made to Region (5), the flag (duty.flg) (of this time) is set to "0" if the (previous) flag (duty.flg) before transition is "−1." This is because it is believed that when the state where the flag (duty.flg) is "−1" and the dead zone compensating function is active at the time of a step-down operation has made a transition to the state where the absolute value of the battery current value (ibat_det) is less than a threshold and the DC bus voltage deviation is less than the threshold (+dc_V) (Region (5)), the DC bus voltage value (vdc_det) has been lowered sufficiently by the dead zone compensating function in the step-down operation before transition so that it is unnecessary to increase the battery current value (ibat_det) with the dead zone compensating function after transition to Region (5). Thereby, in the charging and discharging control based on the DC bus voltage deviation, the below-described operation of compensating for the PWM voltage instruction value (pwm_v) is canceled.

Region (6) is a driving region of "+bat_I≤battery current value (ibat_det) and 0≤DC bus voltage deviation <+dc_V." When the driving region has made a transition to Region (6), the flag (duty.flg) is set to the same value as the (previous) flag (duty.flg) before transition (duty.flg=previous duty.flg).

Region (7) is a driving region of "battery current value (ibat_det)≤−bat_I and −dc_V<DC bus voltage deviation<0." When the driving region has made a transition to Region (7), the flag (duty.flg) is set to the same value as the (previous) flag (duty.flg) before transition (duty.flg=previous duty.flg).

Region (8) is a driving region of "−bat_I<battery current value (ibat_det)<+bat_I and −dc_V<DC bus voltage deviation<0." When the driving region has made a transition to Region (8), the flag (duty.flg) (of this time) is set to the same value "−1" as the (previous) flag (duty.flg) before transition if the (previous) flag (duty.flg) is "−1," and the flag (duty.flg) (of this time) is set to "0" if the (previous) flag (duty.flg) before transition is "0" or "+1."

Here, when a transition has been made to Region (8), the flag (duty.flg) (of this time) is set to "0" if the (previous) flag (duty.flg) before transition is "+1." This is because it is believed that when the state where the flag (duty.flg) is "+1" and the dead zone compensating function is active at the time of a step-up operation has made a transition to the state where the absolute value of the battery current value (ibat_det) is less than a threshold and the DC bus voltage deviation is higher than the threshold (−dc_V) (Region (8)), the DC bus voltage value (vdc_det) has been raised sufficiently by the dead zone compensating function in the step-up operation before transition so that it is unnecessary to increase the battery current value (ibat_det) with the dead zone compensating function after transition to Region (8). Thereby, in the charging and discharging control based on the DC bus voltage deviation, the below-described operation of compensating for the PWM voltage instruction value (pwm_v) is canceled.

Region (9) is a driving region of "+bat_I≤battery current value (ibat_det) and −dc_V<DC bus voltage deviation<0." When the driving region has made a transition to Region (9), the flag (duty.flg) is set to the same value as the (previous) flag (duty.flg) before transition (duty.flg=previous duty.flg).

Region (10) is a driving region of "battery current value (ibat_det)≤−bat_I and DC bus voltage deviation≤−dc_V." When the driving region has made a transition to Region (10), the flag (duty.flg) is set to the same value as the (previous) flag (duty.flg) before transition (duty.flg=previous duty.flg).

Region (11) is a driving region of "−bat_I<battery current value (ibat_det)<+bat_I and DC bus voltage deviation≤−dc_V." When the driving region has made a transition to Region (11), the flag (duty.flg) is set to "−1" (duty.flg=−1). Here, the flag (duty.flg) is set to "−1" when a transition has been made to Region (11). This is for furthering a step-down operation by increasing the absolute value of the battery current value (ibat_det), which is expressed as a negative value as a current flowing from the DC bus 110 toward the battery 19, by starting to activate the dead zone compensating function because if the absolute value of the battery current value (ibat_det) is less than a threshold and the DC bus voltage deviation is less than or equal to the threshold (−dc_V) during a step-down operation, this is the state where current does not flow sufficiently from the DC bus 110 to the battery 19 although the DC bus voltage value (vdc_det) is relatively high so that it is necessary to lower the voltage of the DC bus 110.

Region (12) is a driving region of "+bat_I≤battery current value (ibat_det) and DC bus voltage deviation≤−dc_V." When the driving region has made a transition to Region (12), the flag (duty.flg) is set to the same value as the (previous) flag (duty.flg) before transition (duty.flg=previous duty.flg).

Here, when the step-up and step-down converter 100 is activated, "the battery current value (ibat_det) equals 0 and the DC bus voltage deviation {DC bus target voltage value (vdc_ref)−DC bus voltage value (vdc_det)} equals 0," which driving state is included in Region (5). Therefore, when the step-up and step-down converter 100 is activated, the drive region illustrated in FIG. 11 starts from Region (5) and makes transitions to other regions based on changes in the battery current value (ibat_det) and the DC bus voltage deviation {DC bus target voltage value (vdc_ref)−DC bus voltage value (vdc_det)}.

Accordingly, the activation of the dead zone compensating function is started when the driving region makes a transition from the state where the flag (duty.flg) is "0" to Region (2) so that the flag (duty.flg) changes to "+1" or when the driving region makes a transition from the state where the flag (duty.flg) is "0" to Region (11) so that the flag (duty.flg) changes to "−1." That is, the activation of the dead zone compensating function is started when the absolute value of the DC bus voltage deviation becomes greater than or equal to a predetermined voltage value (dc_V) and the absolute value of the battery current value (ibat_det) becomes smaller than a predetermined low current value (bat_I).

Further, the dead zone compensating function is deactivated when the driving region makes a transition from the state where the flag (duty.flg) is "−1" to Region (5) so that the flag (duty.flg) changes to "0" or when the driving region makes a transition from the state where the flag (duty.flg) is "+1" to Region (8) so that the flag (duty.flg) changes to "0." That is, the dead zone compensating function is deactivated when the absolute value of the battery current value (ibat_det) is smaller than a predetermined low current value (bat_I) and the DC bus voltage deviation becomes zero or when the sign of the DC bus voltage deviation is reversed.

In other cases, if the flag (duty.flg) remains "0" after a transition of the driving region, the dead zone compensating function is kept canceled, and if the flag (duty.flg) remains "−1" or "+1" after a transition of the driving region, the dead zone compensating function is kept active.

As described above, a region where the horizontal axis is negative is a region where the voltage of the DC bus 110 is lowered (the battery 19 is charged), and a region where the vertical axis is positive is a region where there is a drop in the voltage of the DC bus 110. Therefore, Region (1) and Region (4) are driving regions that are normally not gone through.

Likewise, a region where the horizontal axis is positive is a region where the voltage of the DC bus 110 is raised (the electric power is supplied from the reactor 101 to the DC bus 110), and a region where the vertical axis is negative is a region where there is a rise in the voltage of the DC bus 110. Therefore, Region (9) and Region (12) are driving regions that are normally not gone through.

[Combining Operation Based on Dead Zone Compensating Function]

Next, a description is given of the contents of the operation of the PWM instruction combining part 204 (the combining operation based on the dead zone compensating function). Here, the dead zone compensating function is in an activated state when the flag (duty.flg) is "−1" or "+1" and is in a canceled state when the flag (duty.flg) is "0."

The PWM instruction combining part 204 switches the combining technique in accordance with the value of the flag (duty.flg) as follows.

When the flag (duty.flg) is "0," the compensation duty value (pwm_duty) is not combined (or the compensation duty value (pwm_duty) is added as zero), and the PWM voltage instruction value (pwm_v) is output as the combined duty value (pwm_sum). That is, the combined duty value (pwm_sum)=the PWM voltage instruction value (pwm_v).

When the flag (duty.flg) is "1," the compensation duty value (pwm_duty) for raising voltage is combined with the PWM voltage instruction value (pwm_v). That is, the combined duty value (pwm_sum)=the PWM voltage instruction value (pwm_v)+the compensation duty value (pwm_duty) for raising voltage.

When the flag (duty.flg) is "−1," the compensation duty value (pwm_duty) for raising voltage is combined with the PWM voltage instruction value (pwm_v). That is, the combined duty value (pwm_sum)=the PWM voltage instruction value (pwm_v)−the compensation duty value (pwm_duty) for raising voltage.

Thus, the compensation duty value (pwm_duty) is combined when the flag (duty.flg) is "1" or "−1."

Further, the PWM instruction combining part 204 adds, as the compensation duty value (pwm_duty), the amount of control corresponding to a PWM duty value representing an inflection point when the flag (duty.flg) changes from "0" to "1" or "−1" (when the activation of the dead zone compensating function is started). Then, with respect to the integral component value (I component value) and the proportional component value (P component value) included in the PWM voltage instruction value (pwm_v) output from the PWM instruction calculating part 203, the PWM instruction combining part 204 replaces the integral component value (I component value) with the opposite of the proportional component value (P component value). As a result, the value of the PWM voltage instruction value (pwm_v) becomes zero (a function as a replacing part).

On the other hand, when the flag (duty.flg) changes from "1" or "−1" to "0" (when the dead zone compensating function is deactivated), the PWM instruction combining part 204 replaces the integral component value (I component value) included in the PWM voltage instruction value (pwm_v) output from the PWM instruction calculating part 203 with the sum of the integral component value (I component value) and the compensation duty value (pwm_duty) immediately before the deactivation of the dead zone compensating function (a function as the replacing part).

Figure 12:
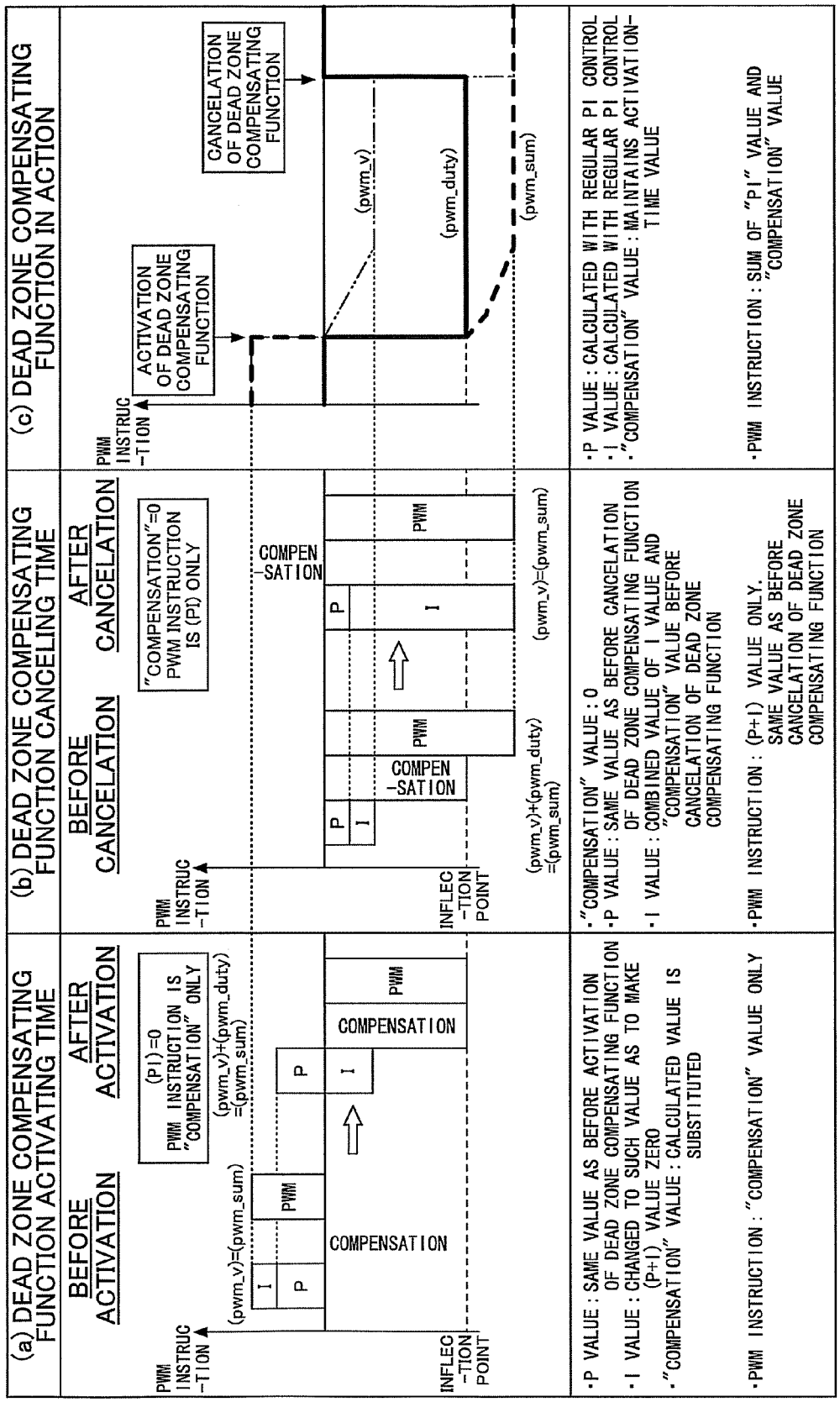
FIG. 12 is a principle diagram for illustrating a combining operation based on a dead zone compensating function at the time of lowering voltage in the drive controller of the step-up and step-down converter of the third embodiment, where (a), (b), and (c) illustrate an operation at the time of starting the activation of the dead zone compensating function, an operation at the time of deactivating the dead zone compensating function, and an operation during the active state of the dead zone compensating function, respectively, over time.
Figure 13:
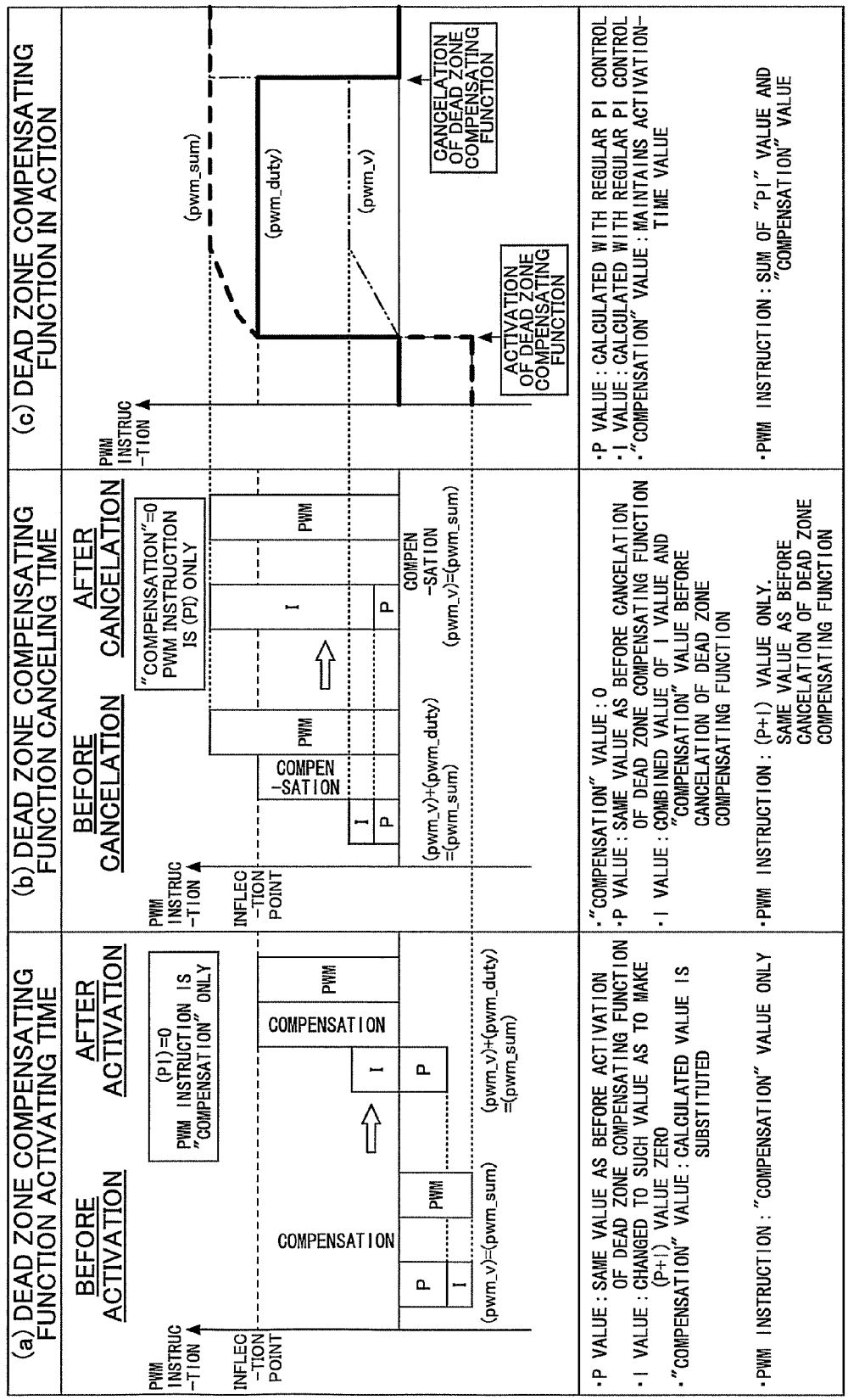
FIG. 13 is a principle diagram for illustrating the combining operation based on the dead zone compensating function at the time of raising voltage in the drive controller of the step-up and step-down converter of the third embodiment, where (a), (b), and (c) illustrate an operation at the time of starting the activation of the dead zone compensating function, an operation at the time of deactivating the dead zone compensating function, and an operation during the active state of the dead zone compensating function, respectively, over time.

Next, a description is given of the above-described combining operation based on the dead zone compensating function using FIG. 12 and FIG. 13.

[Combining Operation Based on Dead Zone Compensating Function at Step-Down Time]

FIG. 12 is a principle diagram for illustrating the combining operation based on the dead zone compensating function at the time of lowering voltage in the drive controller of the step-up and step-down converter 100 of the third embodiment, where (a), (b), and (c) illustrate an operation at the time of starting the activation of the dead zone compensating function, an operation at the time of deactivating the dead zone compensating function, and an operation during the active state of the dead zone compensating function, respectively, over time. This combining operation based on the dead zone compensating function is executed by the PWM instruction combining part 204.

In the drawings, P and I shown in the bar graph of the PWM voltage instruction value (pwm_v) represent the ratio of the proportional component value (P component value) and the integral component value (I component value).

Here, it is when the driving region makes a transition from the state where the flag (duty.flg) is "0" to Region (11) so that the flag (duty.flg) changes to "−1" that the activation of the dead zone compensating function is started at the time of lowering voltage. Further, it is when the driving region makes a transition from the state where the flag (duty.flg) is "−1" to Region (5) so that the flag (duty.flg) changes to "0" that this dead zone compensating function is deactivated.

As illustrated in FIG. 12(a), the compensation duty value (pwm_duty) input from the compensation value switching part 207 is zero before starting to activate the dead zone compensating function (in the case of flag (duty.flg)="0"). Accordingly, the combined duty value (pwm_sum) equals the PWM voltage instruction value (pwm_v).

Next, when the flag (duty.flg) changes to "−1" because of the transition of the driving region to Region (11) so that the activation of the dead zone compensating function is started, the compensation duty value (pwm_duty) is combined with the PWM voltage instruction value (pwm_v), so that the combined duty value (pwm_sum) equals the sum of the PWM voltage instruction value (pwm_v) and the compensation duty value (pwm_duty).

At this point, as illustrated in FIG. 12(a), the proportional component value (P component value) included in the PWM voltage instruction value (pwm_v) remains the same before and after the start of the activation of the dead zone compensating function, while the integral component value (I component value) immediately after the start of the activation of the dead zone compensating function is replaced with the opposite of the proportional component value (P component value). Thus, the value of the PWM voltage instruction value (pwm_v) is caused to be zero immediately after the start of the activation of the dead zone compensating function.

Actually, therefore, the combined duty value (pwm_sum) equals the compensation duty value (pwm_duty).

Here, the value of the compensation duty value (pwm_duty) is the amount of control corresponding to a PWM duty value representing the inflection point on the step-down side in the current value characteristic relative to the PWM duty value of the step-up and step-down converter 100. Thereafter, the duty instruction value (pwm_ref) is determined based on the sum of the compensation duty value (pwm_duty) and the PWM duty value, so that charging and discharging control is performed.

Accordingly, according to the hybrid construction machine of the third embodiment, in the case where the absolute value of the battery current value (ibat_det) of the step-up and step-down converter 100 is less than a predetermined value and the absolute value of the DC bus voltage deviation is more than or equal to a predetermined value, and there is a rise in the DC bus voltage value (vdc_det) so that a step-down operation is required, if it is determined that a sufficient battery current value (ibat_det) cannot be obtained, the compensation duty value (pwm_duty) is combined with the PWM voltage instruction value (pwm_v) in the PWM instruction combining part 204 by starting to activate the dead zone compensating function. Therefore, as illustrated in FIG. 12(c), the absolute value of the combined duty value (pwm_sum) is increased, thereby increasing the absolute value of the final duty instruction value (pwm_ref) for driving the step-up and step-down converter 100. This increases current flowing from the DC bus 110 toward the battery 19. As a result, it is possible to provide a drive controller of the step-up and step-down converter 100, which has good current responsiveness and is capable of keeping the voltage value of the DC bus 110 within a certain range without a delay in the response of current to a PWM duty in a low current region unlike the conventional one.

Next, a description is given, using FIG. 12(b), of an operation at the time of deactivating the dead zone compensating function at the time of lowering voltage. In the activated state of the dead zone compensating function (in the case of flag (duty.flg)="−1"), the compensation duty value (pwm_duty) input from the compensation value switching part 207 is combined, so that the combined duty value (pwm_sum) is the sum of the PWM voltage instruction value (pwm_v) and the compensation duty value (pwm_duty).

Next, when the flag (duty.flg) changes to "0" so that the dead zone compensating function is deactivated, the compensation duty value (pwm_duty) is made zero, so that the combined duty value (pwm_sum) equals the PWM voltage instruction value (pwm_v).

At this point, as illustrated in FIG. 12(b), the proportional component value (P component value) included in the PWM voltage instruction value (pwm_v) remains the same before and after the deactivation of the dead zone compensating function, while the integral component value (I component value) immediately after the deactivation of the dead zone compensating function is replaced with the sum of the integral component value (I component value) and the compensation duty value (pwm_duty) immediately before the deactivation of the dead zone compensating function.

Accordingly, the value of the combined duty value (pwm_sum) remains the same before and after the deactivation of the dead zone compensating function, so that the continuity is maintained. Therefore, it is possible to prevent the deactivation of the dead zone compensating function from decreasing the controllability of the step-up and step-down converter 100.

After the deactivation of the dead zone compensating function, the flag (duty.flg) becomes "0" to prevent the compensation duty value (pwm_duty) from being combined into the combined duty value (pwm_sum), so that the combined duty value (pwm_sum) equals the PWM voltage instruction value (pwm_v). Therefore, the step-up and step-down converter 100 is driven by the PWM voltage instruction value (pwm_v) generated by PI control in the PWM instruction calculating part 203.

[Combining Operation Based on Dead Zone Compensating Function at Step-Up Time]

FIG. 13 is a principle diagram for illustrating the combining operation based on the dead zone compensating function at the time of raising voltage in the drive controller of the step-up and step-down converter 100 of the third embodiment, where (a), (b), and (c) illustrate an operation at the time of starting the activation of the dead zone compensating function, an operation at the time of deactivating the dead zone compensating function, and an operation during the active state of the dead zone compensating function, respectively, over time. Like the operation at the time of lowering the voltage, this combining operation based on the dead zone compensating function at the time of raising voltage is executed by the PWM instruction combining part 204. In the drawings, P and I shown in the bar graph of the PWM voltage instruction value (pwm_v) represent the ratio of the proportional component value (P component value) and the integral component value (I component value).

Here, it is when the driving region makes a transition from the state where the flag (duty.flg) is "0" to Region (2) because of a change in the DC bus voltage deviation so that the flag (duty.flg) changes to "+1" that the activation of the dead zone compensating function is started at the time of raising voltage. Further, it is when the driving region makes a transition from the state where the flag (duty.flg) is "+1" to Region (8) so that the flag (duty.flg) changes to "0" that this dead zone compensating function is deactivated.

As illustrated in FIG. 13(a), the compensation duty value (pwm_duty) input from the compensation value switching part 207 is zero before starting to activate the dead zone compensating function (in the case of flag (duty.flg)="0"). Accordingly, the combined duty value (pwm_sum) equals the PWM voltage instruction value (pwm_v).

Next, when the flag (duty.flg) changes to "+1" because of the transition of the driving region to Region (2) so that the activation of the dead zone compensating function is started, the compensation duty value (pwm_duty) is combined with the PWM voltage instruction value (pwm_v), so that the combined duty value (pwm_sum) equals the sum of the PWM voltage instruction value (pwm_v) and the compensation duty value (pwm_duty).

At this point, as illustrated in FIG. 13(a), the proportional component value (P component value) included in the PWM voltage instruction value (pwm_v) remains the same before and after the start of the activation of the dead zone compensating function, while the integral component value (I component value) immediately after the start of the activation of the dead zone compensating function is replaced with the opposite of the proportional component value (P component value). Thus, the value of the PWM voltage instruction value (pwm_v) is zero immediately after the start of the activation of the dead zone compensating function.

Actually, therefore, the combined duty value (pwm_sum) equals the compensation duty value (pwm_duty).

Here, the value of the compensation duty value (pwm_duty) is the amount of control corresponding to a PWM duty value representing the inflection point on the step-up side in the current value characteristic relative to the PWM duty value of the step-up and step-down converter 100.

Accordingly, according to the hybrid construction machine of the third embodiment, in the case where the absolute value of the battery current value (ibat_det) of the step-up and step-down converter 100 is less than a predetermined value and the absolute value of the DC bus voltage deviation is more than or equal to a predetermined value, and there is a drop in the DC bus voltage value (vdc_det) so that a step-up operation is required, if it is determined that a sufficient battery current value (ibat_det) cannot be obtained, the compensation duty value (pwm_duty) is combined with the PWM voltage instruction value (pwm_v) in the PWM instruction combining part 204 by starting to activate the dead zone compensating function. Therefore, as illustrated in FIG. 13(c), the absolute value of the combined duty value (pwm_sum) is increased, thereby increasing the absolute value of the final duty instruction value (pwm_ref) for driving the step-up and step-down converter 100. This increases current flowing from the battery 19 toward the DC bus 110. As a result, it is possible to provide a drive controller of the step-up and step-down converter 100, which has good current responsiveness and is capable of keeping the voltage value of the DC bus 110 within a certain range without a delay in the response of current to a PWM duty in a low current region unlike the conventional one.

Next, a description is given, using FIG. 13(b), of an operation at the time of deactivating the dead zone compensating function at the time of raising voltage. In the activated state of the dead zone compensating function (in the case of flag (duty.flg)="+1"), the compensation duty value (pwm_duty) input from the compensation value switching part 207 is combined, so that the combined duty value (pwm_sum) is the sum of the PWM voltage instruction value (pwm_v) and the compensation duty value (pwm_duty).

Next, when the flag (duty.flg) changes to "0" so that the dead zone compensating function is deactivated, the compensation duty value (pwm_duty) is made zero, so that the combined duty value (pwm_sum) equals the PWM voltage instruction value (pwm_v).

At this point, as illustrated in FIG. 13(b), the proportional component value (P component value) included in the PWM voltage instruction value (pwm_v) remains the same before and after the deactivation of the dead zone compensating function, while the integral component value (I component value) immediately after the deactivation of the dead zone compensating function is replaced with the sum of the integral component value (I component value) and the compensation duty value (pvm_duty) immediately before the deactivation of the dead zone compensating function.

Accordingly, the value of the combined duty value (pwm_sum) remains the same before and after the deactivation of the dead zone compensating function, so that the continuity is maintained. Therefore, it is possible to prevent the deactivation of the dead zone compensating function from decreasing the controllability of the step-up and step-down converter 100.

After the deactivation of the dead zone compensating function, the flag (duty.flg) becomes "0" to prevent the compensation duty value (pwm_duty) from being combined into the combined duty value (pwm_sum), so that the combined duty value (pwm_sum) equals the PWM voltage instruction value (pwm_v). Therefore, the step-up and step-down converter 100 is driven by the PWM voltage instruction value (pwm_v) generated by PI control in the PWM instruction calculating part 203.

Figure 14:
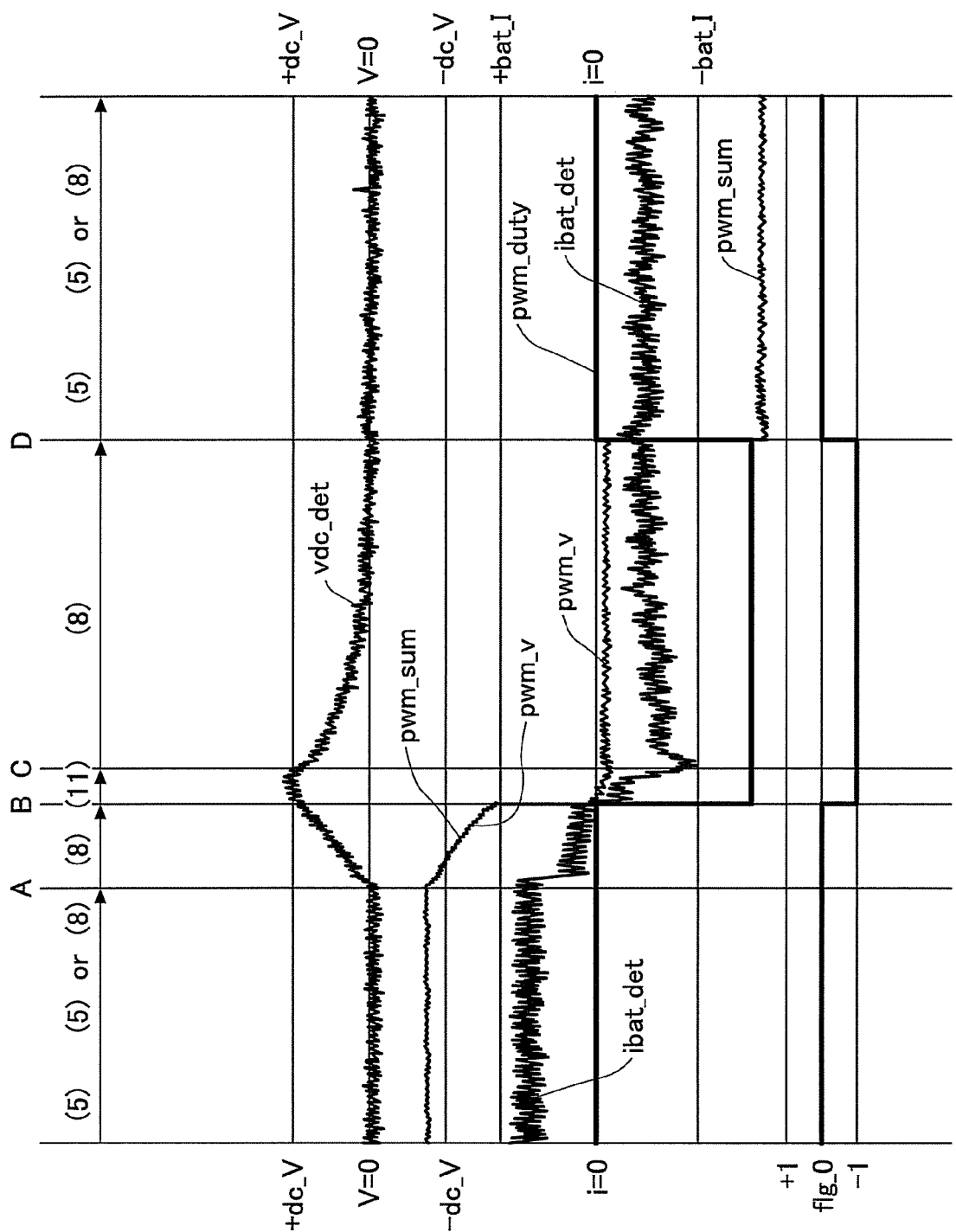
FIG. 14 is a characteristic diagram illustrating an operating characteristic according to the drive controller of the step-up and step-down converter of the hybrid construction machine of the third embodiment.

FIG. 14 is a characteristic diagram illustrating an operating characteristic according to the drive controller of the step-up and step-down converter of the hybrid construction machine of the third embodiment.

Immediately after starting to drive the step-up and step-down converter 100, the driving region is Region (5) so that the flag (duty.flg) is maintained at "0." Therefore, the combined duty value (pwm_sum) equals the PWM voltage instruction value (pwm_v), so that the step-up and step-down converter 100 is subjected to PI control by the PWM voltage instruction value (pwm_v) generated by the PWM instruction calculating part 203.

Immediately after the start of the driving up to Time Point A, there is a flow of a substantially constant battery current value (ibat_det) in order to accelerate (perform the power running of) the rotation electric motor 21 so that the DC bus voltage value (vdc_det) varies between −dc_V and +dc_V. This state corresponds to a state where slight variations in the DC bus voltage deviation cause switching back and forth between Region (5) and Region (8) illustrated in FIG. 11.

In the state where the driving region is in Region (5) or Region (8) like this, the flag (duty.flg) is maintained at "0." Therefore, the combined duty value (pwm_sum) equals the PWM voltage instruction value (pwm_v), so that the step-up and step-down converter 100 is subjected to PI control by the PWM voltage instruction value (pwm_v) generated by the PWM instruction calculating part 203.

Next, after Time Point A, the rotation electric motor 21 starts to decelerate (perform a regenerative operation). This reduces the battery current value (ibat_det) supplied from the battery 19 to the rotation electric motor 21 and increases the DC bus voltage value (vdc_det). As a result, the DC bus voltage deviation {DC bus target voltage value (vdc_ref)−DC bus voltage value (vdc_det)} becomes smaller than zero.

At this point, the driving region makes a transition to Region (8), but the flag (duty.flg) continues to be maintained at "0."

Further, when an electric load such as a motor performs a regenerative operation, regenerated current is produced. Accordingly, the DC bus voltage value (vdc_clet) increases, and the ratio of the battery voltage value (vbat_det) to the DC bus voltage value (vdc_det) is decreased. This is because the value of a current flowing from the battery 19 to the DC bus 110 is reduced because of the necessity of lowering the voltage of the DC bus 110 (charging the battery 19) due to the rise of the detected DC bus voltage value.

Further, although not illustrated in FIG. 14, when an electric load such as a motor performs a power running operation, the electric load requires a supply of electric power, so that the DC bus voltage value (vdc_det) is reduced. In this case, the reduction in the DC bus voltage value (vdc_det) makes it necessary to raise the voltage of the DC bus 110 (discharge the battery 19).

Next, after Time Point B, the production of regenerated power by the rotation electric motor 21 reverses the direction of the battery current value (ibat_det), and a current due to the regenerated power starts to flow to the battery 19. This further increases the DC bus voltage value (vdc_det), so that the DC bus voltage deviation {DC bus target voltage value (vdc_ref)−DC bus voltage value (vdc_det)} becomes smaller than the threshold "−dc_V."

Without this compensation, there is a problem in that the continuation of such a state where the absolute value of the DC bus voltage deviation continues to increase reduces the speed of current decrease because of the effect of a dead zone region in a low current region near the switching point of a step-up operation and a step-down operation due to the DC bus characteristic, so that the DC bus voltage value (vdc_det) excessively increases to be overvoltage to damage an apparatus such as a driver of the motor 91.

However, according to the hybrid construction machine of the third embodiment, in the state where the DC bus voltage deviation is large in the low current region, the activation of the dead zone compensating function is started to positively cause current to flow in order to reduce the DC bus voltage value (vdc_det). In this state, a transition is made from Region (8) to Region (11) in the driving region illustrated in FIG. 11, and the flag (duty.flg) is set to "−1."

As a result, the compensation duty value (pwm_duty) is combined with the PWM voltage instruction value (pwm_v) in the PWM instruction combining part 204, so that the combining duty value (pwm_sum), which is given by combining duty value (pwm_sum)=PWM voltage instruction value (pwm_v)+compensation duty value (pwm_duty), is output.

At this point, the proportional component value (P component value) included in the PWM voltage instruction value (pwm_v) remains the same before and after the start of the activation of the dead zone compensating function, while the integral component value (I component value) immediately after the start of the activation of the dead zone compensating function is replaced with the opposite of the proportional component value (P component value). Thus, immediately after the start of the activation of the dead zone compensating function, the value of the PWM voltage instruction value (pwm_v) is zero (P+I=0). Actually, therefore, the combined duty value (pwm_sum) equals the compensation duty value (pwm_duty).

As a result, like the battery current value (Ibat_det) illustrated in FIG. 14, a current flowing toward the battery 19 from the DC bus 110 in order to lower the voltage of the DC bus 110 increases (that is, the absolute value of the battery current value (Ibat_det) increases), thereby making it possible to lower the DC bus voltage value (vdc_det).

As a result, it is possible to improve the responsiveness of current in a low current region near the switching point of a step-up operation and a step-down operation, so that it is possible to keep the DC bus voltage value (vdc_det) within a certain range without causing substantial variations in the DC bus voltage value (vdc_det).

Thereafter, the state where the compensation duty value (pwm_duty) is combined with the PWM voltage instruction value (pwm_v) in the PWM instruction combining part 204 continues. Of these, the PWM voltage instruction value (pwm_v) is a value generated by PI control in the PWM instruction calculating part 203. Therefore, the step-down operation is continued, so that the DC bus voltage value (vdc_det) is reduced. The reduction in the DC bus voltage value (vdc_det) reduces the absolute value of the DC bus voltage deviation, and the driving region makes a transition (returns) to Region (8) in response to the DC bus voltage deviation exceeding the threshold "−dc_V." This corresponds to Time Point C.

The flag (duty.flg) is still kept "−1" after the transition of the driving region to Region (8) after Time Point C. Thereafter, the state where the compensation duty value (pwm_duty) is combined with the PWM voltage instruction value (pwm_v) in the PWM instruction combining part 204 continues. Of these, the PWM voltage instruction value (pwm_v) is a value generated by PI control in the PWM instruction calculating part 203. Therefore, the step-down operation is continued, so that the DC bus voltage deviation is stabilized. At this point, when the DC bus voltage deviation becomes greater than or equal to 0 (V), the driving region makes a transition to Region (5). This corresponds to Time Point D.

When the driving region makes a transition from Region (8) to Region (5) at Time Point D, the transition to Region (5) is made with the flag (duty.flg) being "−1." Therefore, the flag (duty.flg) switches to "0," so that the dead zone compensating function is deactivated.

The dead zone compensating function is thus deactivated. This is because it is believed that the DC bus voltage value (vdc_det) has been sufficiently reduced by the dead zone compensating function at the time of the step-down operation, thus making it unnecessary to increase the battery current value (ibat_det) with the dead zone compensating function.

When the dead zone compensating function is deactivated, the compensation duty value is made zero so that the combined duty value (pwm_sum) equals the PWM voltage instruction value (pwm_v). At this point, as illustrated in FIG. 12(b), the proportional component value (P component value) included in the PWM voltage instruction value (pwm_v) remains the same before and after the deactivation of the dead zone compensating function, while the integral component value (I component value) immediately after the deactivation of the dead zone compensating function is replaced with the sum of the integral component value (I component value) and the compensation duty value (pwm_duty) immediately before the deactivation of the dead zone compensating function.

Accordingly, as illustrated in FIG. 12(c), the value of the combined duty value (pwm_sum) remains the same before and after the deactivation of the dead zone compensating function, so that the continuity is maintained. Therefore, even when the dead zone compensating function is deactivated, it is possible to stabilize the DC bus voltage value (vdc_det) of the step-up and step-down converter 100 substantially at a constant value.

After the deactivation of the dead zone compensating function, the flag (duty.flg) becomes "0" to prevent the compensation duty value (pwm_duty) from being combined into the combined duty value (pwm_sum), so that the combined duty value (pwm_sum) equals the PWM voltage instruction value (pwm_v). Therefore, the step-up and step-down converter 100 is driven by the PWM voltage instruction value (pwm_v) generated by PI control in the PWM instruction calculating part 203.

Further, when the DC bus voltage deviation varies slightly to be below 0 (V) during driving in Region (5) after the dead zone compensating function is deactivated and the flag (duty.flg) becomes "0," the driving region again makes a transition to Region (8). However, the flag (duty.flg) is kept "0" in the case of a transition from Region (5) to Region (8). Therefore, the step-up and step-down converter 100 is also driven by the PWM voltage instruction value (pwm_v) generated by PI control in the PWM instruction calculating part 203 thereafter.

As described above, according to the hybrid construction machine of the third embodiment, the current responsiveness in a low current region near the switching point of a step-up operation and a step-down operation is improved. Thereby, it is possible to keep the voltage value of the DC bus 110 within a certain range, to prevent damage to a driver of a load due to overvoltage, and to maintain the controllability of the load in a good state.

The example operation of FIG. 14 illustrates the case where the activation of the dead zone compensating function at the time of lowering voltage is started through a transition from Region (5) to Region (8) to Region (11) and the dead zone compensating function is thereafter deactivated. The start of the activation and the deactivation of the dead zone compensating function at the time of raising voltage are performed in the same manner through a transition from Region (2) to Region (5) to Region (8). Accordingly, their description is omitted.

Further, the example operation of FIG. 14 illustrates the case of −bat_I<battery current value (ibat_det)<+bat_I. In the case of battery current value (ibat_det)≤−bat_I (in the case of Regions (1), (4), (7), and (10)), the value of the flag (duty.flg) is kept a value before transition (the previous value). Therefore, when the battery current value (ibat_det) becomes less than or equal to −bat_I, it is only that the activated state or the canceled state of the dead zone compensating function is maintained. Therefore, a description of an operation in the case of battery current value (ibat_det)≤−bat_I. The same applies to the case of +bat_I≤battery current value (ibat_det) (the case of Regions (3), (6), (9), and (12)).

The control part of a drive controller of a step-up and step-down converter used for the hybrid construction machine of the third embodiment can be implemented by either an electronic circuit or a processor.

[Fourth Embodiment]

Figure 16:
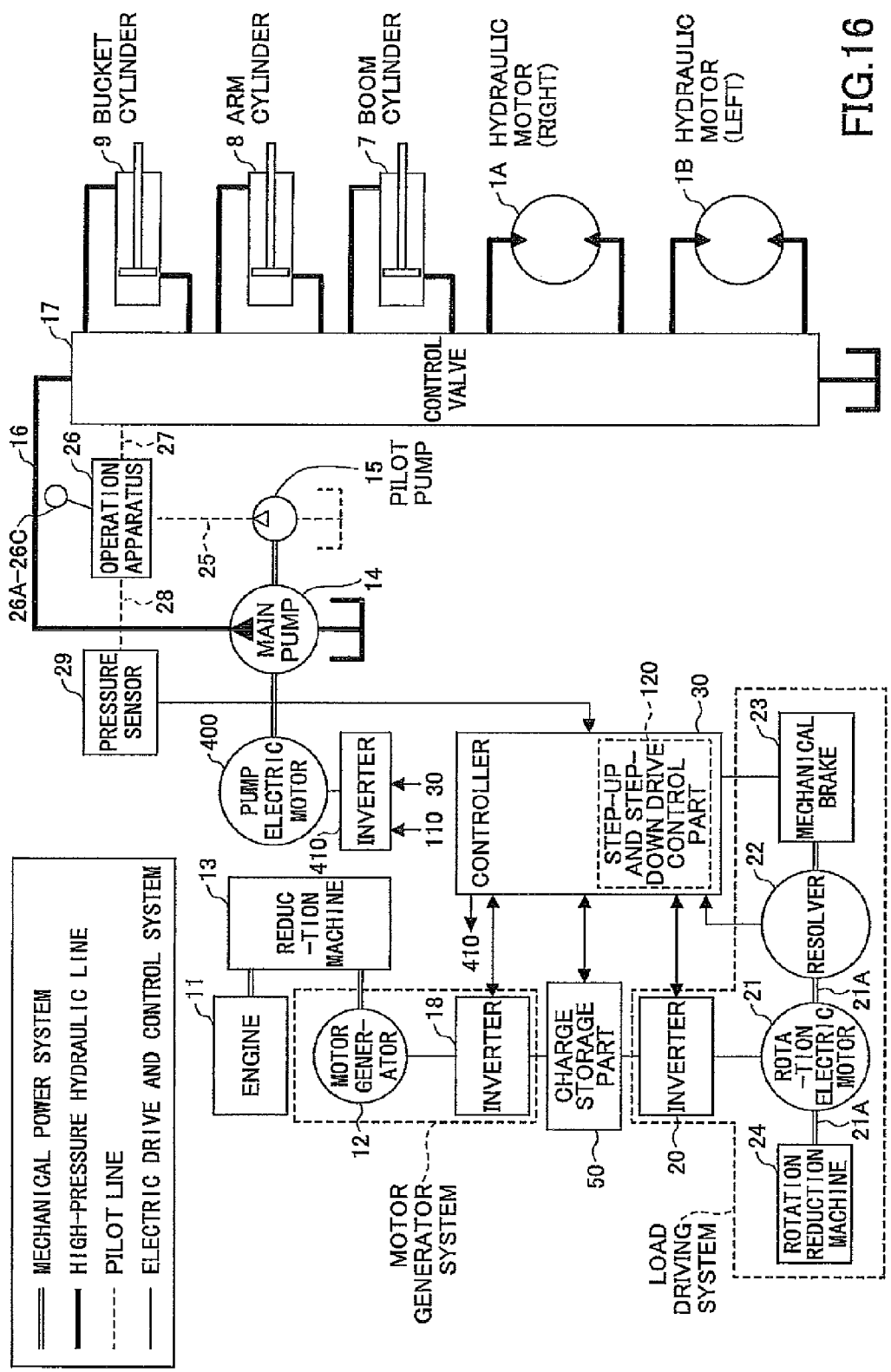
FIG. 16 is a block diagram illustrating a configuration of a hybrid construction machine of a fourth embodiment.

FIG. 16 is a block diagram illustrating a configuration of a hybrid construction machine of a fourth embodiment. The hybrid construction machine of the fourth embodiment is different from the hybrid construction machine of the first embodiment in that the main pump 14 is driven by a pump electric motor 400 and the motor generator 12 assists the engine 11 (an electric motor operation) or collects electric power due to being driven by the engine 11 (a generator operation). Otherwise, the configuration is the same as the hybrid construction machine of the first embodiment. Accordingly, the same elements are marked with the same numerals, and a description thereof is omitted.

The pump electric motor 400 is configured to perform only a power running operation for driving the main pump 14, and is connected to the DC bus 110 via an inverter 410.

This pump electric motor 400 is configured to be driven by the step-up and step-down drive control part 120. When one of the levers 26A through 26C is operated, electric power is supplied from the DC bus 110 to the pump electric motor 400 via the inverter 410. Thereby, a power running operation is performed to drive the pump 14 so that pressure oil is ejected.

Therefore, such a situation is possible where one of the motor generator 12, the pump electric motor 400, and the rotation electric motor 21 is supplied with electric power via the DC bus 110. Further, such a situation is possible where one of the motor generator 12 and the rotation electric motor 21 supplies electric power to the DC bus 110.

According to the fourth embodiment, the step-up and step-down converter 100 performs the control of switching a step-up operation and a step-down operation in accordance with the operating states of the motor generator 12, the pump electric motor 400, and the rotation electric motor 21 so that the DC bus voltage value falls within a certain range.

The DC bus 110 is provided between the inverters 18, 410, and 20 and the step-up and step-down converter 100, and transfers electric power between the battery 19 and the pump electric motor 400 and the rotation electric motor 21.

Like in the hybrid construction machine of the first embodiment, it is possible to prevent variations in the controllability of a load in such a hybrid construction machine of the fourth embodiment as well. Further, it is possible to prevent damage in the inverters 18 and 20 of loads due to overcurrent, so that it is possible to improve the operational continuity. Further, the same as in the second and the third embodiment, it is possible to provide a hybrid construction machine capable of stably switching a step-up operation and a step-down operation without damaging the step-up IGBT 102A and the step-down IGBT 102B, preventing damage to the driver of a load due to overvoltage, and maintaining the controllability of the load in a good state.

In the above, a description is given of a configuration where PI control is employed. However, the control method is not limited to the PI control method, and may also be hysteresis control, robust control, adaptive control, proportional control, integral control, gain scheduling control, or sliding mode control.

A description is given above of the hybrid construction machines of examples illustrative of the present invention. However, the present invention is not limited to the specifically disclosed embodiments, and variations and modifications may be made without departing from the scope of the claims.

The present international application claims priority based on Japanese Patent Application No. 2007-334350, filed on Dec. 26, 2007, the entire contents of which are incorporated herein by reference.

The invention claimed is:

1. A hybrid construction machine, comprising:
an internal combustion engine;
a hydraulic pump connected to the internal combustion engine;
a motor generator connected to the hydraulic pump;
a working element driven by the hydraulic pump;
a rotation mechanism rotationally driven by a rotation electric motor; and
a charge storage part connected to an inverter of the motor generator and an inverter of the rotation electric motor,
wherein the charge storage part includes
a constant voltage charge storage part configured to maintain a voltage value thereof within a certain range, the constant voltage charge storage part including a capacitor provided between the inverter of the motor generator and the inverter of the rotation electric motor;
a step-up and step-down converter electrically connected to the constant voltage charge storage part; and
a variable voltage charge storage part whose charging and discharging are controlled by the step-up and step-down converter.

2. The hybrid construction machine as claimed in claim 1, further comprising:
a step-up and step-down drive control part configured to control switching of a voltage raising operation and a voltage lowering operation of the step-up and step-down converter,
wherein the step-up and step-down converter has a first side thereof connected to the constant voltage charge storage part and has a second side thereof connected to the variable voltage charge storage part, the step-up and step-down converter being configured to raise or lower the voltage value of the constant voltage charge storage part by varying a voltage value of the variable voltage charge storage part.

3. The hybrid construction machine as claimed in claim 2, further comprising:
a voltage value detecting part configured to detect the voltage value of the constant voltage charge storage part,
wherein the step-up and step-down drive control part is configured to control the switching of the voltage raising operation and the voltage lowering operation based on the voltage value detected by the voltage value detecting part.

4. The hybrid construction machine as claimed in claim 2, wherein the step-up and step-down drive control part is configured to control the switching of the voltage raising operation and the voltage lowering operation in accordance with an operating state of the rotation electric motor so that the voltage value of the constant voltage charge storage part falls within the certain range.

5. The hybrid construction machine as claimed in claim 2, wherein the step-up and step-down drive control part is configured to provide a time of no operation in switching one to another of the voltage raising operation and the voltage lowering operation of the step-up and step-down converter.

6. The hybrid construction machine as claimed in claim 3, wherein:
the step-up and step-down converter includes
a step-up switching device for controlling a supply of electric power from the variable voltage charge storage part to the constant voltage charge storage part;
a step-down switching device for controlling a supply of electric power from the constant voltage charge storage part to the variable voltage charge storage part; and
a reactor connected to the step-up switching device and the step-down switching device, and
the step-up and step-down drive control part includes
a voltage control part configured to control driving of the step-up switching device or the step-down switching device so that the voltage value of the voltage value detecting part becomes a voltage target value;
a current control part configured to control driving of the step-up switching device or the step-down switching device so that a value of a current flowing through the reactor becomes a predetermined current threshold; and
a control switching part configured to perform switching selectively to one of the voltage control part and the current control part so that a load on the step-up and step-down converter becomes less than or equal to a predetermined load.

7. The hybrid construction machine as claimed in claim 6, wherein the control switching part is configured to perform switching to a drive control by the current control part in response to an absolute value of the current flowing through the reactor becoming greater than the current threshold during performance of a drive control by the voltage control part.

8. The hybrid construction machine as claimed in claim 6, wherein the control switching part is configured to perform switching to a drive control by the voltage control part in response to the voltage value of the voltage value detecting part returning to the voltage target value during performance of a drive control by the current control part.

9. The hybrid construction machine as claimed in claim 6, wherein in switching one to another of the voltage control part and the current control part, the step-up and step-down drive control part is configured to correct an initial value of a control target value after the switching.

10. The hybrid construction machine as claimed in claim 2, wherein the step-up and step-down drive control part is configured to perform such control as to increase a charging or discharge current in a dead zone region of the step-up and step-down converter.

11. The hybrid construction machine as claimed in claim 2, wherein the step-up and step-down drive control part comprises:
a main control part configured to calculate a PWM duty value for driving the step-up and step-down converter so that the voltage value of the constant voltage charge storage part follows a target voltage value;
a compensation duty value calculating part configured to calculate a compensation duty value for compensating for the PWM duty value in a predetermined low current region in a current value characteristic of the step-up and step-down converter relative to the PWM duty value; and
a combining part configured to perform a combining operation of combining the compensation duty value with the PWM duty value calculated by the main control part.

12. The hybrid construction machine as claimed in claim 11, wherein the main control part is configured to calculate the PWM duty value by PI control based on a deviation between the voltage value of the constant voltage charge storage part and the target voltage value, further comprises a replacing part configured to replace an integral component value included in the PWM duty value with an opposite of a proportional component value at a time of starting an activation of the combining operation.

13. The hybrid construction machine as claimed in claim 11, wherein the compensation duty value calculating part is configured to calculate, as the compensation duty value, a duty value corresponding to the PWM duty value at an inflection point on a step-up side or a step-down side in the current value characteristic of the step-up and step-down converter relative to the PWM duty value.

14. A method of controlling a hybrid construction machine including an internal combustion engine, a hydraulic pump connected to the internal combustion engine, a motor generator connected to the hydraulic pump, a working element driven by the hydraulic pump, a rotation mechanism rotationally driven by a rotation electric motor, and a charge storage part connected to an inverter of the motor generator and an inverter of the rotation electric motor and including a constant voltage charge storage part and a variable voltage charge storage part, the method comprising:
maintaining a voltage value of the constant voltage charge storage part within a certain range, wherein the constant voltage charge storage part includes a capacitor provided between the inverter of the rotation electric motor and the inverter of the motor generator connected to the hydraulic pump connected to the internal combustion engine; and
controlling charging and discharging of the variable voltage charge storage part by a step-up and step-down converter electrically connected to the constant voltage charge storage part.

* * * * *